US012265269B2

(12) United States Patent
Bookbinder et al.

(10) Patent No.: US 12,265,269 B2
(45) Date of Patent: Apr. 1, 2025

(54) FIBER OPTIC CONNECTORS AND CONNECTORIZED CABLE ASSEMBLY WITH SEALING COMPONENTS

(71) Applicant: Corning Research & Development Corporation, Corning, NY (US)

(72) Inventors: Dana Craig Bookbinder, Corning, NY (US); Michael De Jong, Colleyville, TX (US); Konrad Jan Koziel, Lodz (PL); Claudio Mazzali, Painted Post, NY (US); Pushkar Tandon, Painted Post, NY (US); Ruchi Sarda Tandon, Painted Post, NY (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 828 days.

(21) Appl. No.: 17/330,152

(22) Filed: May 25, 2021

(65) Prior Publication Data

US 2021/0278602 A1  Sep. 9, 2021

Related U.S. Application Data

(63) Continuation of application No. PCT/US2019/057754, filed on Oct. 24, 2019.

(60) Provisional application No. 62/772,568, filed on Nov. 28, 2018.

(51) Int. Cl.
 *G02B 6/38* (2006.01)
(52) U.S. Cl.
 CPC ......... *G02B 6/3888* (2021.05); *G02B 6/3849* (2013.01); *G02B 6/3869* (2013.01); *G02B 6/38875* (2021.05)

(58) Field of Classification Search
 CPC .. G02B 6/3888; G02B 6/3849; G02B 6/3869; G02B 6/38875
 See application file for complete search history.

(56) References Cited

U.S. PATENT DOCUMENTS

2017/0322379 A1\* 11/2017 de Jong ............... G02B 6/3869
2018/0241139 A1\* 8/2018 Cabanero ........... H01R 13/5205

FOREIGN PATENT DOCUMENTS

DE  202005022029 U1 \* 7/2012 ............. H01B 7/288
JP  2001-313113 A  11/2001

OTHER PUBLICATIONS

International Search Report and Written Opinion of the International Searching Authority; PCT/US19/057754; Mailed Jan. 28, 2020; 11 Pages; European Patent Office.

\* cited by examiner

*Primary Examiner* — Michael P Mooney
(74) *Attorney, Agent, or Firm* — William D. Doyle

(57) ABSTRACT

A fiber optic connector that includes a connector body comprising a ferrule retaining portion, a pusher engagement portion and a body cable passage extending through the pusher engagement portion and the ferrule retaining portion. The connector includes a ferrule assembly structurally configured to be retained by the ferrule retaining portion with an optical fiber bore of the ferrule assembly in alignment with the body cable passage. The connector includes a pusher structurally configured to axially engage the pusher engagement portion with a pusher cable passage in alignment with the body cable passage, and a seal component with superabsorbent properties.

18 Claims, 17 Drawing Sheets

FIBER OPTIC CONNECTORS AND CONNECTORIZED CABLE ASSEMBLY WITH SEALING COMPONENTS

CROSS-REFERENCE TO RELATED APPLICATIONS

This application is a continuation of International Application No. PCT/US2019/057754, filed Oct. 24, 2019, which claims the benefit of U.S. Provisional Application No. 62/772,568, filed Nov. 28, 2018, both applications being incorporated herein by reference in their entirety.

BACKGROUND

Field

The present disclosure is directed to fiber optic connectors and, more specifically, to enhanced sealing integrity in fiber optic connectors and connectorized cable assemblies.

Technical Background

Communication networks are used to transport a variety of signals such as voice, video, data transmission, and the like. As communication networks are upgraded to increase bandwidth to the subscriber, the networks become more reliant on optical signal transmission, and on specific optical hardware including, for example, fiber optic connectors and connectorized fiber optic cable assemblies. Since deployments to the subscriber are typically located outdoors, network operators typically prefer robust connectorization technology that is quick, reliable and trouble-free.

BRIEF SUMMARY

According to the subject matter of the present disclosure, fiber optic connectors, connectorized cable assemblies, and methods for the connectorization of cable assemblies are provided. In accordance with a variety of embodiments of the present disclosure, fiber optic connectors, connectorized cable assemblies, and methods of connectorization are provided where a seal component having superabsorbent properties is utilized to enhance sealing in the connector.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
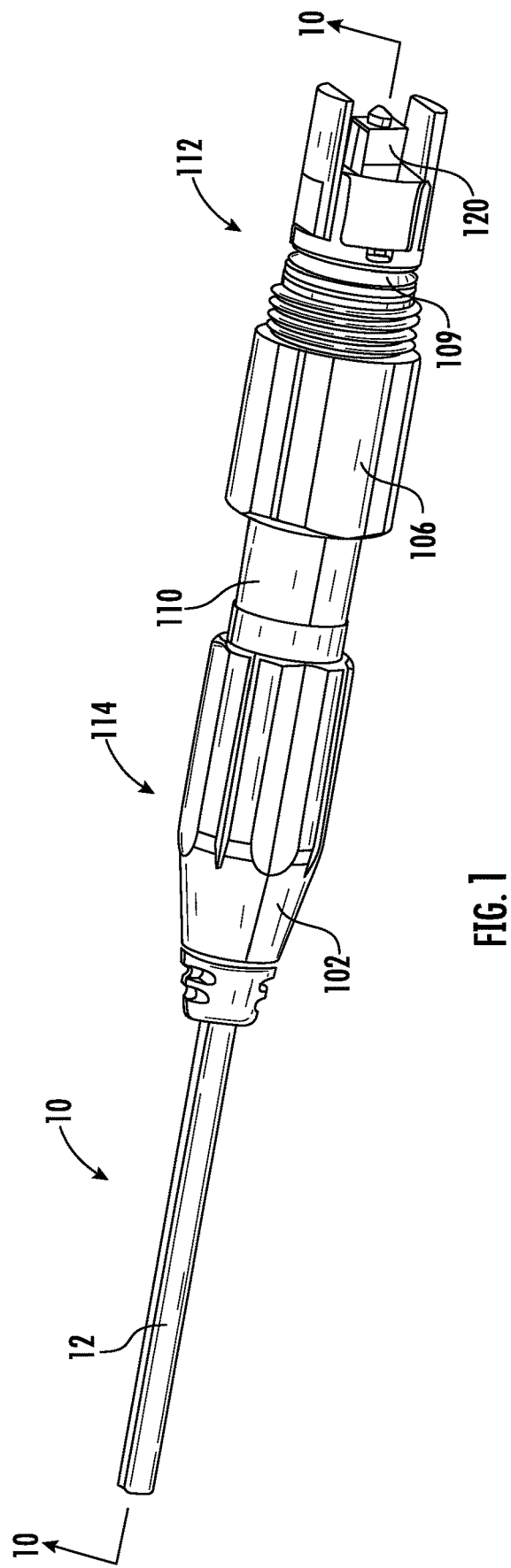
FIG. 1 is an isometric view of a connectorized cable assembly with a fiber optic cable connected therein according to embodiments of the present disclosure.

Reference will now be made in detail to embodiments of fiber optic connectors and connectorized cable assemblies, examples of which are illustrated in the accompanying drawings. Whenever possible, the same reference numerals will be used throughout the drawings to refer to the same or like parts.

Embodiments of the fiber optic connectors and connectorized cable assemblies may include a fiber optic connector that includes a connector body comprising a ferrule retaining portion, a pusher engagement portion and a body cable passage extending through the pusher engagement portion and the ferrule retaining portion. The connector includes a ferrule assembly structurally configured to be retained by the ferrule retaining portion with an optical fiber bore of the ferrule assembly in alignment with the body cable passage. The connector includes a pusher structurally configured to axially engage the pusher engagement portion with a pusher cable passage in alignment with the body cable passage, and a seal component with superabsorbent properties. Various embodiments oft fiber optic connectors and connectorized cable assemblies will be described herein with specific reference to the appended drawings.

Referring initially to FIG. 1, a fiber optic connector 100 is illustrated comprising a rear coupling nut 102, a front coupling nut 106, a connector body 110, and a ferrule assembly 120. The connector body 110 has an elongate annular body and comprises a ferrule retaining portion 112 and a pusher engagement portion 114, with the pusher engagement portion 114 positioned opposite of the ferrule retaining portion 112. The ferrule assembly 120 is coupled to the connector body 110 along the ferrule retaining portion 112 and at least a portion of the ferrule assembly 120 is received within a body cable passage 116 of the connector body 110 when the ferrule assembly 120 is coupled to the ferrule retaining portion 112 of the connector body 110. The fiber optic connector 100 includes a dust cap 109 coupled to ferrule retaining portion 112 of the connector body 110 to seal the ferrule assembly 120 therein. In particular, an o-ring 107 is disposed between the ferrule retaining portion 112 and the dust cap 109 such that the o-ring 107 is configured to provide a sealed engagement between the connector body 110 and the dust cap 109. As will be described in greater detail herein, the fiber optic connector 100 further comprises a pusher 130 and a collapsing cantilevered gasket 140 that are structurally configured to couple to the connector body 110.

The rear coupling nut 102 of the fiber optic connector 100 is coupled to the connector body 110 along an exterior of the connector body 110 adjacent to the pusher engagement portion 114. In particular, the rear coupling nut 102 is disposed over at least a portion of the exterior of the connector body 110, and in particular over the pusher engagement portion 114, such that at least a portion of the connector body 110 extends into the rear coupling nut 102. As will be described in greater detail herein, when coupled to the connector body 110, the rear coupling nut 102 is positioned over a pusher 130 of the fiber optic connector 100 such that the pusher 130 is disposed within a cable passageway of the rear coupling nut 102. The front coupling nut 106 of the fiber optic connector 100 is coupled to the connector body 110 along an exterior of the connector body 110 adjacent to the ferrule retaining portion 112. In particular, the front coupling nut 106 is disposed over at least a portion of the exterior of the connector body 110 such that the ferrule retaining portion 112 of the connector body 110 extends into the front coupling nut 106. The front coupling nut 106 engages the dust cap 109, which is secured to the ferrule retaining portion 112 of the connector body 110. It should be understood that in other embodiments the front coupling nut 106 may be engaged to an adapter positioned along the connector body 110 and structurally configured to couple with the front coupling nut 106 thereon.

The front coupling nut 106, when received along the connector body 110 adjacent to the ferrule retaining portion 112, abuts against a shoulder of the connector body 110. The front coupling nut 106 includes a front threaded portion 113 that is structurally configured to align with and mate a corresponding threaded portion 108 of the dust cap 109 (FIG. 10) when the front coupling nut 106 is engaged with, and disposed over, the ferrule retaining portion 112 of the connector body 110. It should be understood that the front threaded portion 113 of the front coupling nut 106 is disposed over an exterior surface of the connector body 110, with the body cable passage 116 disposed therein, and the corresponding threaded portion 108 of the dust cap 109 extends along an interior surface of the dust cap 109. Accordingly, the threaded portions 108, 113 are configured to mate with one another when the dust cap 109 and the front coupling nut 106 are received over the ferrule retaining portion 112 of the connector body 110.

The ferrule assembly 120 comprises an optical fiber bore 122 extending therethrough, wherein the optical fiber bore 122 is sized and shaped to receive the fiber optic cable 10 therein. The ferrule assembly 120 is structurally configured to be retained by the ferrule retaining portion 112 of the connector body 110 such that the optical fiber bore 122 of the ferrule assembly 120 is aligned with the longitudinal axis A of the connector body 110 when the ferrule assembly 120 is coupled to the ferrule retaining portion 112. It should be understood that in some embodiments the optical fiber bore 122 of the ferrule assembly 120 is offset from and parallel to the longitudinal axis A of the body cable passage 116 of the connector body 110 when the ferrule assembly 120 is coupled to the ferrule retaining portion 112. In this instance, the fiber optic connector 100 may be operable to receive multiple fibers therein such that optical fiber bore 122 of the ferrule assembly 120 is configured to receive the multiple fibers. In other embodiments, the fiber optic connector 100 may include multiple ferrule assemblies 120 therein such that each of the optical fiber bores 122 of the multiple ferrule assemblies 120 are configured to receive at least one fiber therein. Accordingly, it should be understood that the fiber optic connector 100 may be configured as a multi-fiber connector with two or more fibers received in the optical fiber bore 122 that is offset from and parallel to the longitudinal axis A of the body cable passage 116 to accommodate the multiple fibers therein.

In some embodiments, the ferrule assembly 120 may include a mechanical splice connector that is structurally configured to couple with a cable (e.g., a fiber optic cable 10) received within the fiber optic connector 100. In particular, the ferrule assembly 120 may include a stub fiber that is mechanically spliced to an optical fiber of a fiber optic cable 10, or in other embodiments, the ferrule assembly 120 may be structurally configured to optically couple to an optical waveguide of the fiber optic cable 10.

Figure 2:
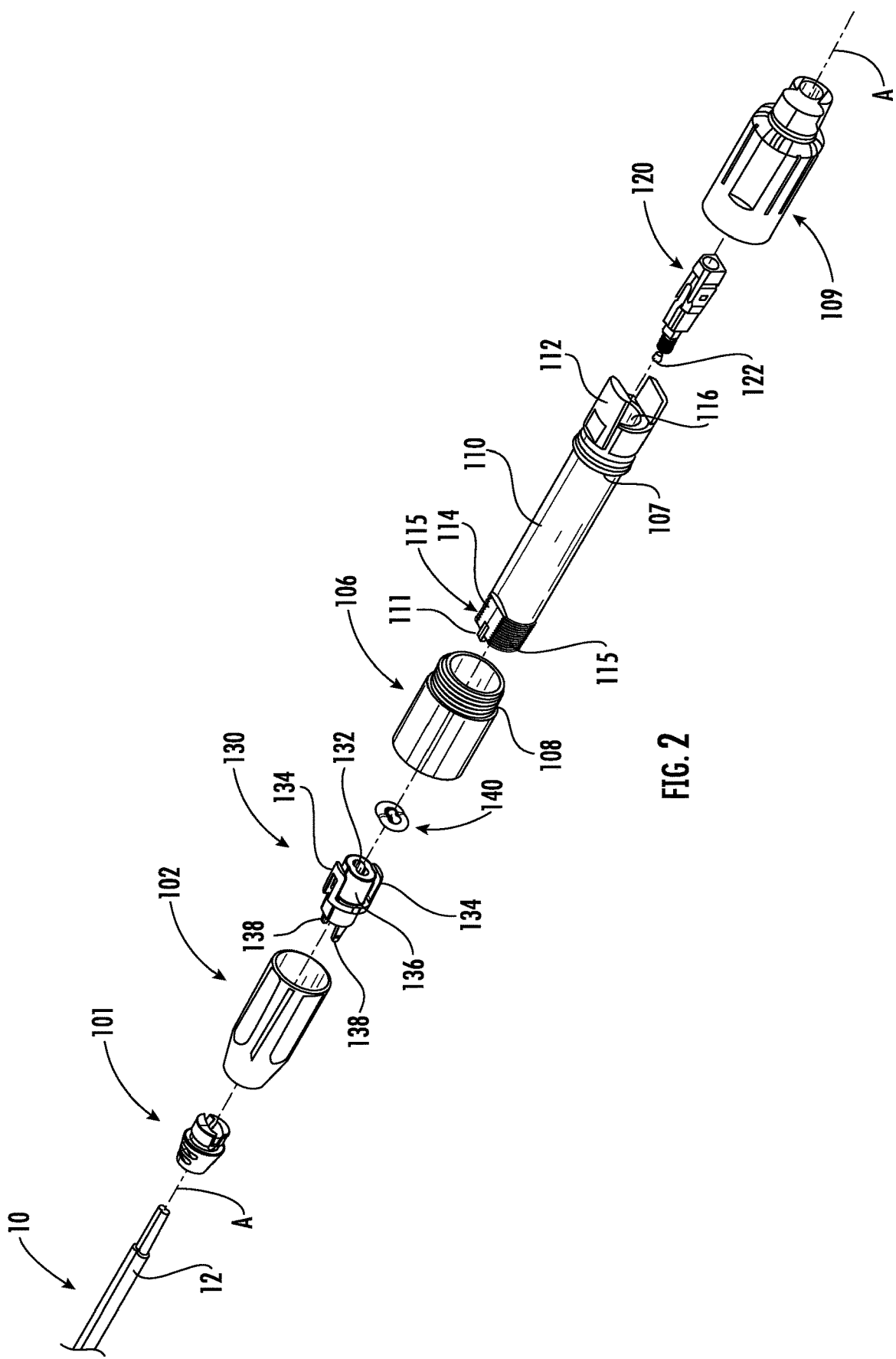
FIG. 2 is an exploded view of the connectorized cable assembly of FIG. 1 according to embodiments of the present disclosure.

Referring now to FIG. 2, the body cable passage 116 of the connector body 110 extends between the ferrule retaining portion 112 and the pusher engagement portion 114, and is sized and shaped to receive the fiber optic cable 10 therein through a cable entry end 118 of the connector body 110. The body cable passage 116 extends from the cable entry end 118 to the ferrule retaining portion 112 of the connector body 110 along a longitudinal axis A extending through the pusher engagement portion 114 of the connector body 110 and the ferrule retaining portion 112 of the connector body 110. As will be described in greater detail herein, the pusher engagement portion 114 of the connector body 110 is sized to receive a collapsing cantilevered gasket 140 therein, and in particular, within a seal cavity 103 of the connector body 110. Additionally, the pusher engagement portion 114 is further sized to receive at least a portion of the pusher 130 (i.e., a bias member 136) within the seal cavity 103 such that the pusher 130 is structurally configured to enclose the collapsing cantilevered gasket 140 within the pusher engagement portion 114.

The connector body 110 includes a rear threaded portion 115 along the pusher engagement portion 114, with the rear threaded portion 115 being structurally configured to align with and mate a corresponding threaded portion 104 of the rear coupling nut 102 (FIG. 11) when the rear coupling nut 102 is engaged with, and disposed over, the pusher engagement portion 114 of the connector body 110. It should be understood that the rear threaded portion 115 is disposed over an exterior surface of the pusher engagement portion 114 of the connector body 110 and the corresponding threaded portion 104 of the rear coupling nut 102 extends along an interior surface of the rear coupling nut 102. Accordingly, the threaded portions 104, 115 are configured to mate with one another when the rear coupling nut 102 is rotatably received over the pusher engagement portion 114 of the connector body 110.

Figure 12:
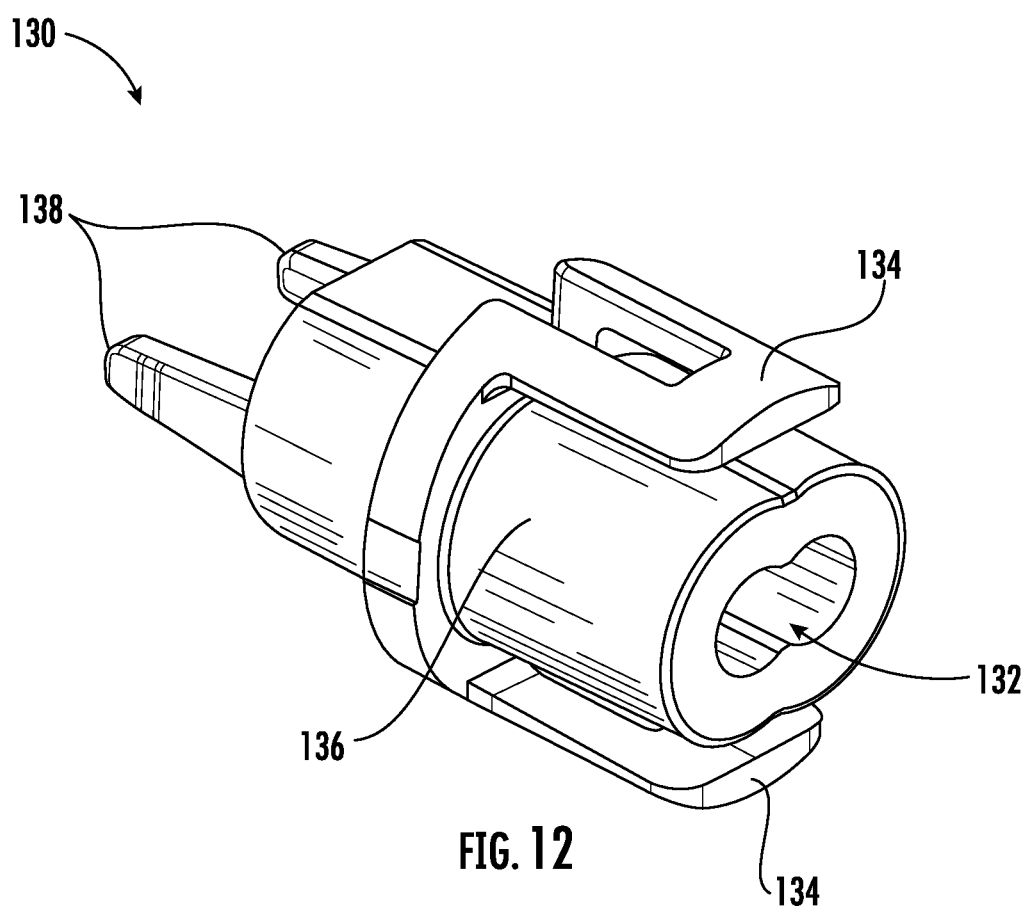
FIG. 12 is an isometric view of the pusher of the connectorized cantilevered gasket of FIG. 1 including a gasket bias member according to embodiments of the present disclosure.

The pusher 130 of the fiber optic connector 100 comprises a pusher cable passage 132 extending therethrough that is sized and shaped to receive the fiber optic cable 10 therein. As will be described in greater detail herein, the pusher 130 further comprises a bias member 136 extending outwardly relative to the pusher 130, with the bias member 136 defining at least a portion of the pusher cable passage 132 such that the bias member 136 is sized and configured to receive the fiber optic cable 10 therethrough (FIG. 12). Extending opposite of the bias member 136, the pusher 130 includes attachment features 138 that are structurally configured to couple the pusher 130 to a cable bend relief boot 101 of the fiber optic connector 100. The cable bend relief boot 101 is positioned along a rear portion of the fiber optic connector 100 and is configured to provide cable strain relief between the fiber optic connector 100 and the fiber optic cable 10 at as the fiber optic cable 10 is received within the body cable passage 116. It should be understood that in embodiments other structures or components may be provided for cable bend relief boot 101 at the rear of the fiber optic connector 100.

Additionally, the attachment features 138 of the pusher 130 are structurally configured to engage corresponding ratchet features of the rear coupling nut 102, when the rear coupling nut 102 is mated with the rear threaded portion 115 of the connector body 110, to thereby securely retain the rear coupling nut 102 in connection with the connector body 110 during use of the fiber optic connector 100. Accordingly, the attachment features 138 couple with the ratchet features of the rear coupling nut 102 and inhibit rotation of the rear coupling nut 102 relative to the pusher engagement portion 114 of the connector body 110.

Figure 3:
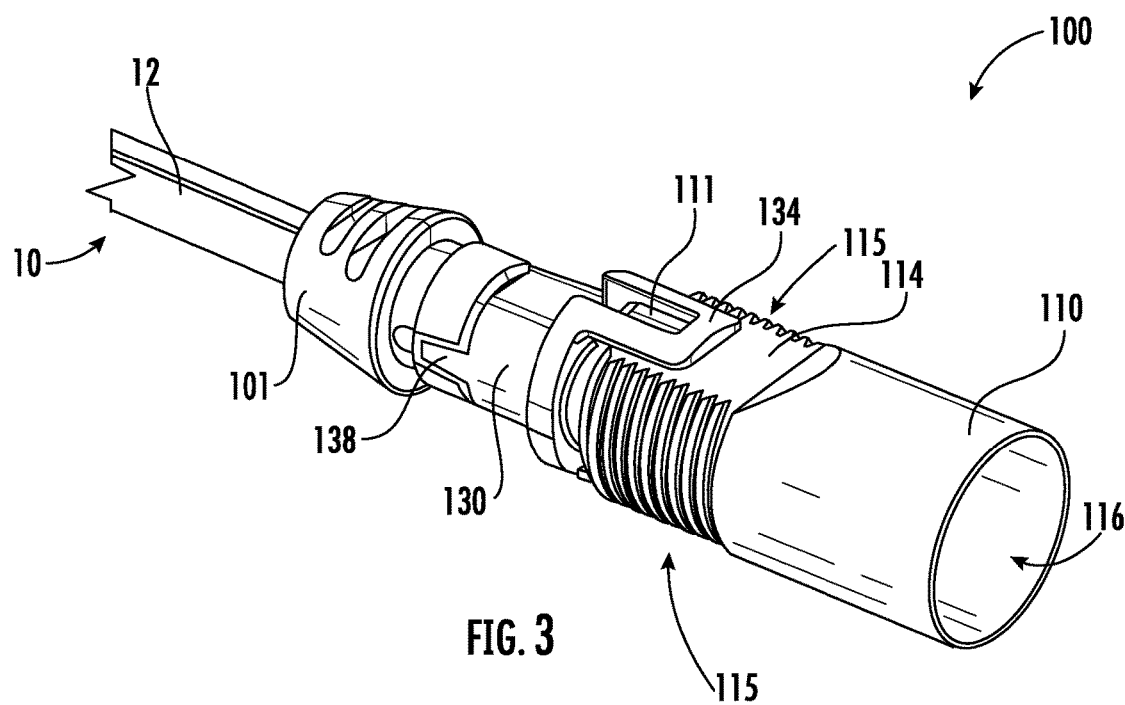
FIG. 3 is an isometric view of the connectorized cable assembly of FIG. 1 including a pusher coupled to a connector body according to embodiments of the present disclosure.

The pusher 130 is structurally configured to mechanically couple to the connector body 110 at the pusher engagement portion 114. In particular, the pusher 130 is structurally configured to axially engage the pusher engagement portion 114 of the connector body 110 with the pusher cable passage 132 in alignment with the longitudinal axis A and the body cable passage 116 of the connector body 110. As best seen in FIG. 3, the pusher 130 includes a body engagement mechanism that is structurally configured to securely couple the pusher 130 to the connector body 110. In the present example, the body engagement mechanism comprises a pair of latches 134 extending outwardly therefrom. With the pusher 130 retained by the connector body 110 at the pusher engagement portion 114, the pair of latches 134 extend over the pusher engagement portion 114 of the connector body 110 to couple with a corresponding engagement mechanism of the connector body 110. It should be understood that in other embodiments the pusher 130 may include various other body engagement mechanisms that are structurally configured to engage the connector body 110.

Figure 4:
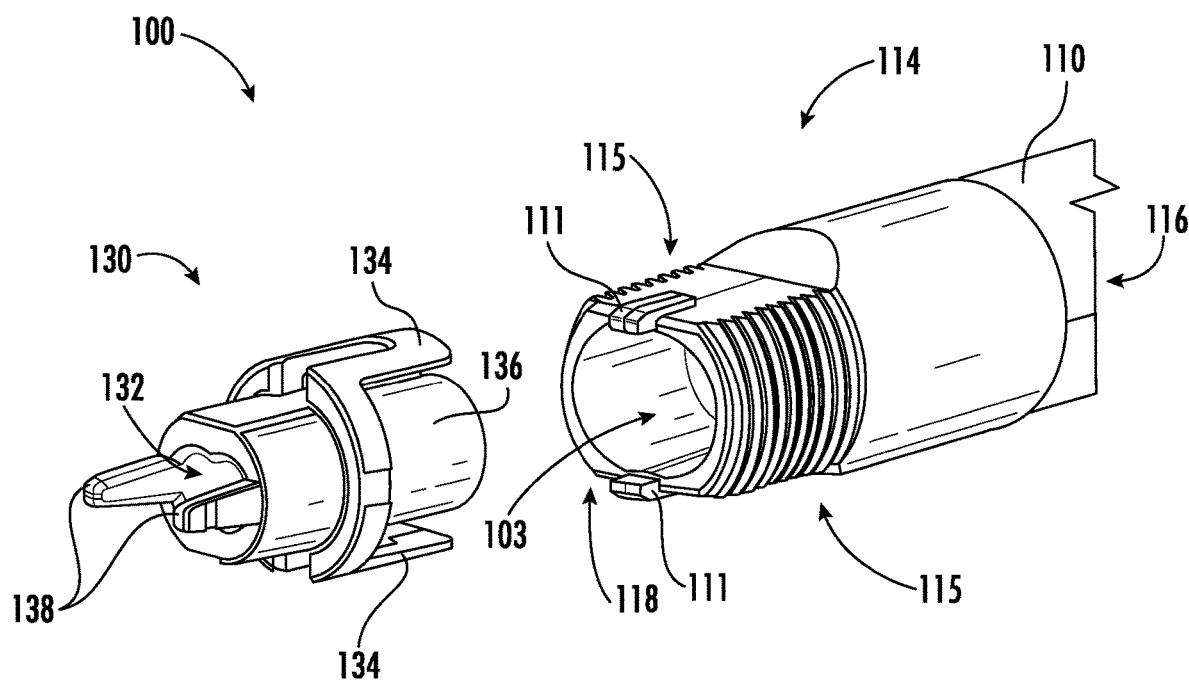
FIG. 4 is an isometric view of the pusher and the connector body of the connectorized cable assembly of FIG. 1 decoupled from one another according to embodiments of the present disclosure.

The connector body 110 includes a pusher engagement mechanism comprising a pair of protrusions 111 that extend outwardly from the pusher engagement portion 114. As best seen in FIG. 4, the pair of protrusions 111 is structurally configured to engage the pair of latches 134 of the pusher 130 when the pusher 130 is received along the pusher engagement portion 114. The pair of protrusions 111 are sized and shaped to fit within the pair of latches 134 of the pusher 130 such that the pair of latches 134 is structurally configured to couple with the pair of protrusions 111 and form a snap-fit engagement. Accordingly, the pair of latches 134 of the pusher 130 are sized and shaped to receive the pair of protrusions 111 therein when the pusher engagement portion 114 couples to the pusher 130. It should be understood that in other embodiments the connector body 110 may include various other pusher engagement mechanisms that are structurally configured to engage a corresponding body engagement mechanism of the pusher 130. In some embodiments, the connector body 110 may define a cavity 117 along the body cable passage 116 that comprises a bowed geometry for aiding the initiation of a bow in the fiber optic cable 10 received therein, and in particular along an optical waveguide of the fiber optic cable 10. As further seen in FIG. 4, the connector body 110 includes a seal cavity 103 disposed within the pusher engagement portion 114 and commencing at a cable entry end 118. As will be described in greater detail herein, the seal cavity 103 is sized and shaped to receive a collapsing cantilevered gasket 140 therein.

As briefly described above, the pusher 130 further comprises a bias member 136 extending outwardly from the pusher 130. In particular, the bias member 136 extends parallel to the longitudinal axis A and is disposed between the pair of latches 134. The bias member 136 is sized and shaped to slidably translate into the seal cavity 103 of the connector body 110 in response to the pusher 130 axially translating toward the connector body 110 and the latches 134 coupling the protrusions 111 along the pusher engagement portion 114. As will be described in greater detail herein, the pusher 130, and in particular the bias member 136, is structurally configured to enclose a collapsing cantilevered gasket 140 within the pusher engagement portion 114 of the connector body 110. In particular, the bias member 136 is structurally configured to compress the collapsing cantilevered gasket 140 along a pusher-engagement end 148 of the collapsing cantilevered gasket 140 as the pusher 130 is axially translated toward the pusher engagement portion 114 of the connector body 110. With the fiber optic connector 100 in an assembled configuration (FIG. 11), the pusher 130 is disposed within the rear coupling nut 102 when the pusher 130 is attached to the pusher engagement portion 114 of the connector body 110 and the rear coupling nut 102 is coupled to the connector body 110.

Figure 5:
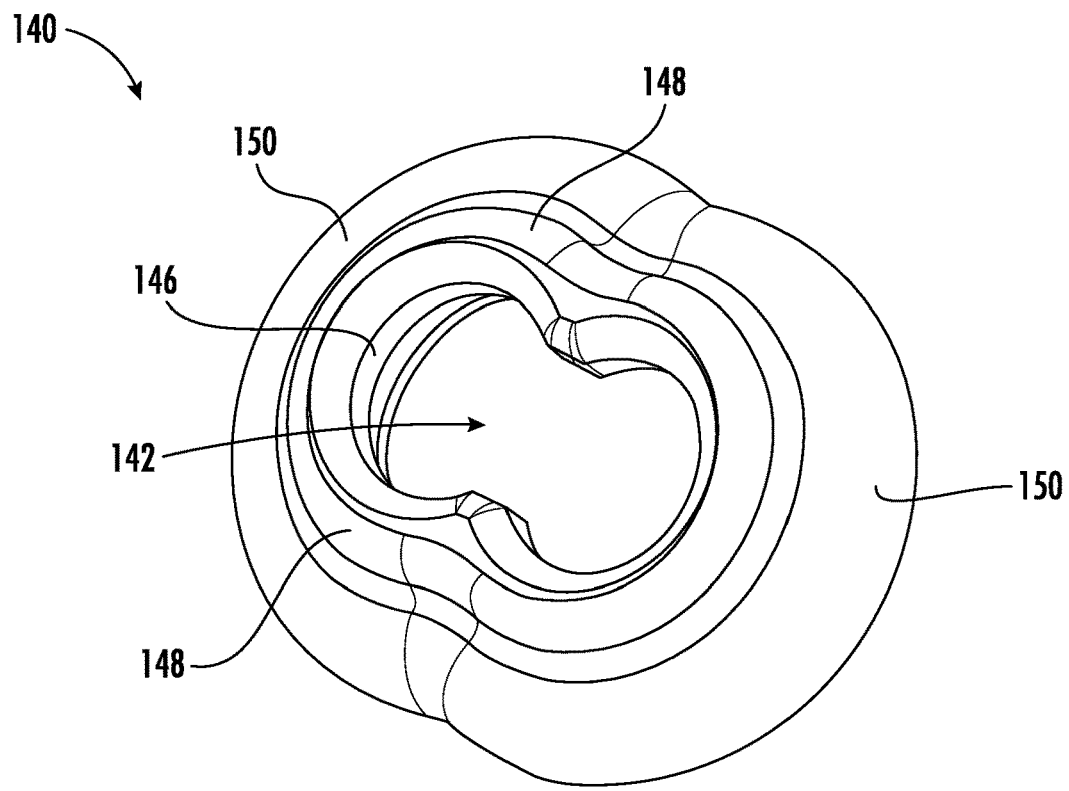
FIG. 5 is an isometric view of a collapsing cantilevered gasket of the connectorized cable assembly of FIG. 1 according to embodiments of the present disclosure.
Figure 6:
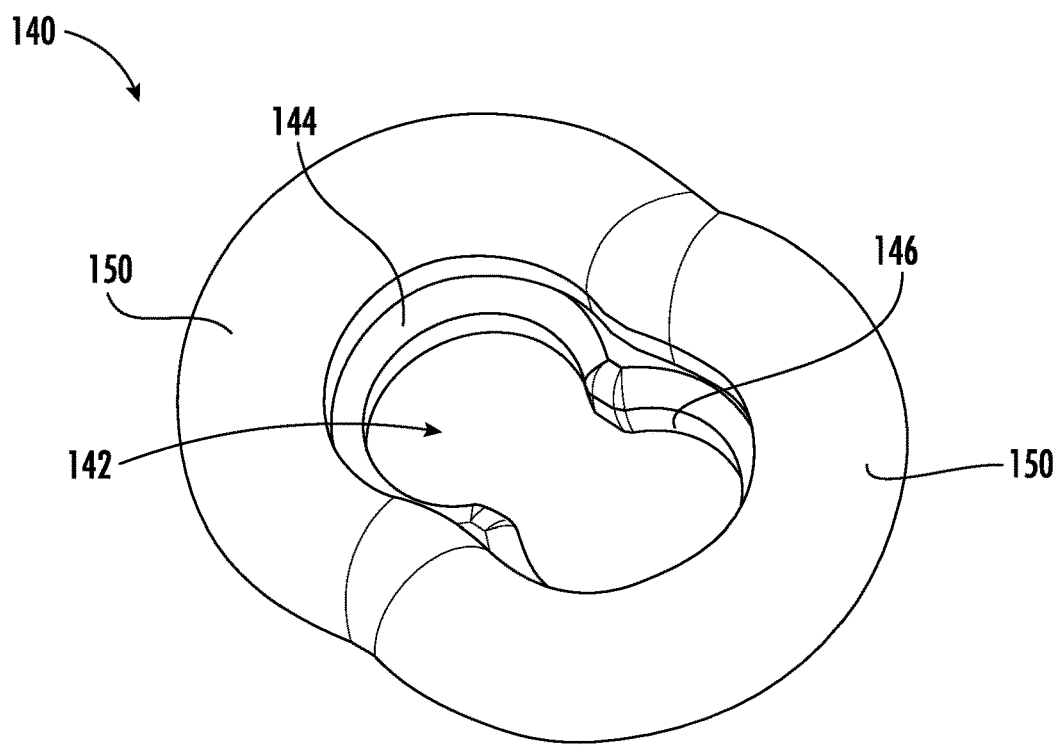
FIG. 6 is an isometric view of the collapsing cantilevered gasket of FIG. 5 according to embodiments of the present disclosure.

Referring now to FIGS. 5 and 6, the fiber optic connector 100 further comprises a collapsing cantilevered gasket 140. The collapsing cantilevered gasket 140 comprises a gasket cable passage 142, an anchored portion 144, a cantilevered portion 146, a pusher-engagement end 148 and a body-engagement end 150. The pusher-engagement end 148 and the body-engagement end 150 of the collapsing cantilevered gasket 140 generally define curved, arcuate sections defining an arcuate outer perimeter. The anchored portion 144 of the collapsing cantilevered gasket 140 is formed about the gasket cable passage 142 at the body-engagement end 150 of the collapsing cantilevered gasket 140. The cantilevered portion 146 is formed about the gasket cable passage 142 at the pusher-engagement end 148 of the collapsing cantilevered gasket 140. In some embodiments, the collapsing cantilevered gasket 140 comprises a pair of conjoined gasket rings with a smaller one of the pair of conjoined gasket rings forming the pusher-engagement end 148 of the collapsing cantilevered gasket 140 and a larger one of the pair of conjoined gasket rings forming the body-engagement end 150 of the collapsing cantilevered gasket 140. The collapsing cantilevered gasket 140 is structurally configured to be seated within the seal cavity 103 of the pusher engagement portion 114 of the connector body 110, adjacent to a stop wall 105.

Figure 7:
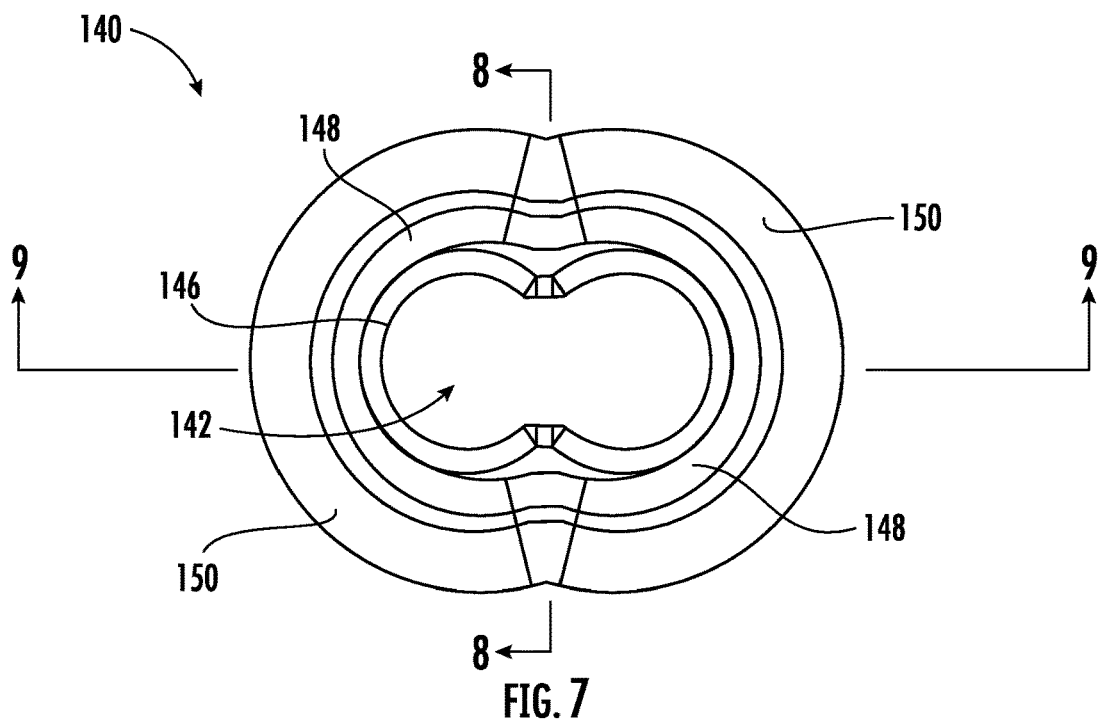
FIG. 7 is a top view of the collapsing cantilevered gasket of FIG. 5 according to embodiments of the present disclosure.

Referring to FIG. 7, the gasket cable passage 142 of the collapsing cantilevered gasket 140 is generally shaped to accommodate and receive the fiber optic cable 10 therethrough, and defines an irregular or non-uniform cross section in accordance with a profile of the cable. In particular, the gasket cable passage 142 of the collapsing cantilevered gasket 140 comprises two distinct strength member passageways arranged to accommodate a cable (e.g., fiber optic cable 10) therein, and in particular a cable comprising a pair of strength members positioned on opposite sides of the cable and/or an optical fiber bundle. In embodiments, the gasket cable passage 142 of the collapsing cantilevered gasket 140 comprises two distinct strength member passageways arranged to approximate an elliptic Booth lemniscate. As will be described in greater detail below, a diameter of the gasket cable passage 142 along the pusher-engagement end 148 of the collapsing cantilevered gasket 140 (i.e., the cantilevered portion 146) is relatively the same size or smaller than a diameter of the fiber optic cable 10. Further, a diameter of the gasket cable passage 142 along the body-engagement end 150 of the collapsing cantilevered gasket 140 (i.e., the anchored portion 144) is relatively larger than a diameter of the fiber optic cable 10. In this instance, the cantilevered portion 146 of the collapsing cantilevered gasket 140 is structurally configured to expand in response to a cable passing through the gasket cable passage 142. It should be understood that the fiber optic connectors of the present disclosure may be configured to accommodate a variety of cable profiles or types for cable sealing, in addition to those shown and described herein.

Figure 8:
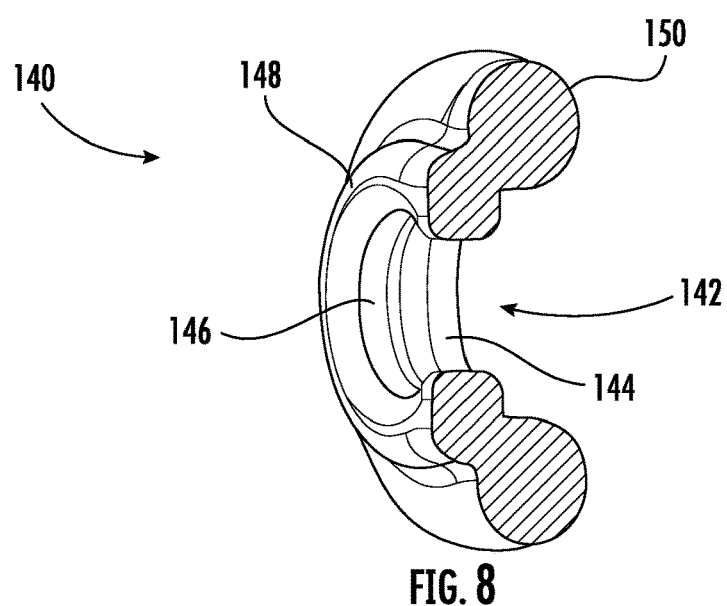
FIG. 8 is a cross section view of the collapsing cantilevered gasket of FIG. 5 according to embodiments of the present disclosure, with the cross section taken along lines 8-8 of FIG. 7.
Figure 9:
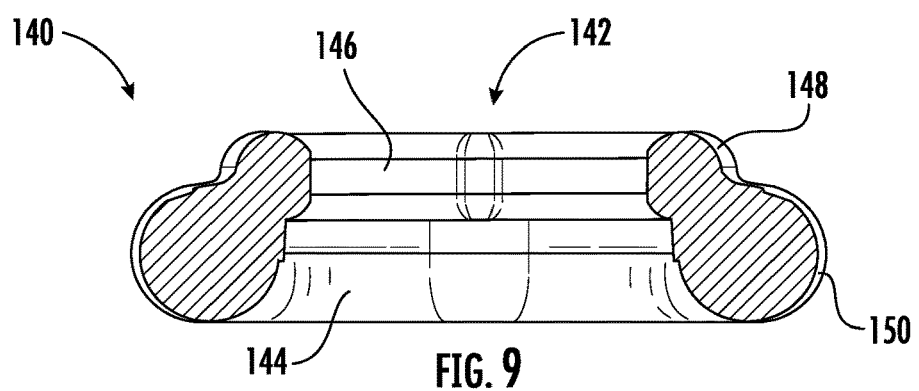
FIG. 9 is a cross section view of the collapsing cantilevered gasket of FIG. 6 according to embodiments of the present disclosure, with the cross section taken along lines 9-9 of FIG. 7.
Figure 11:
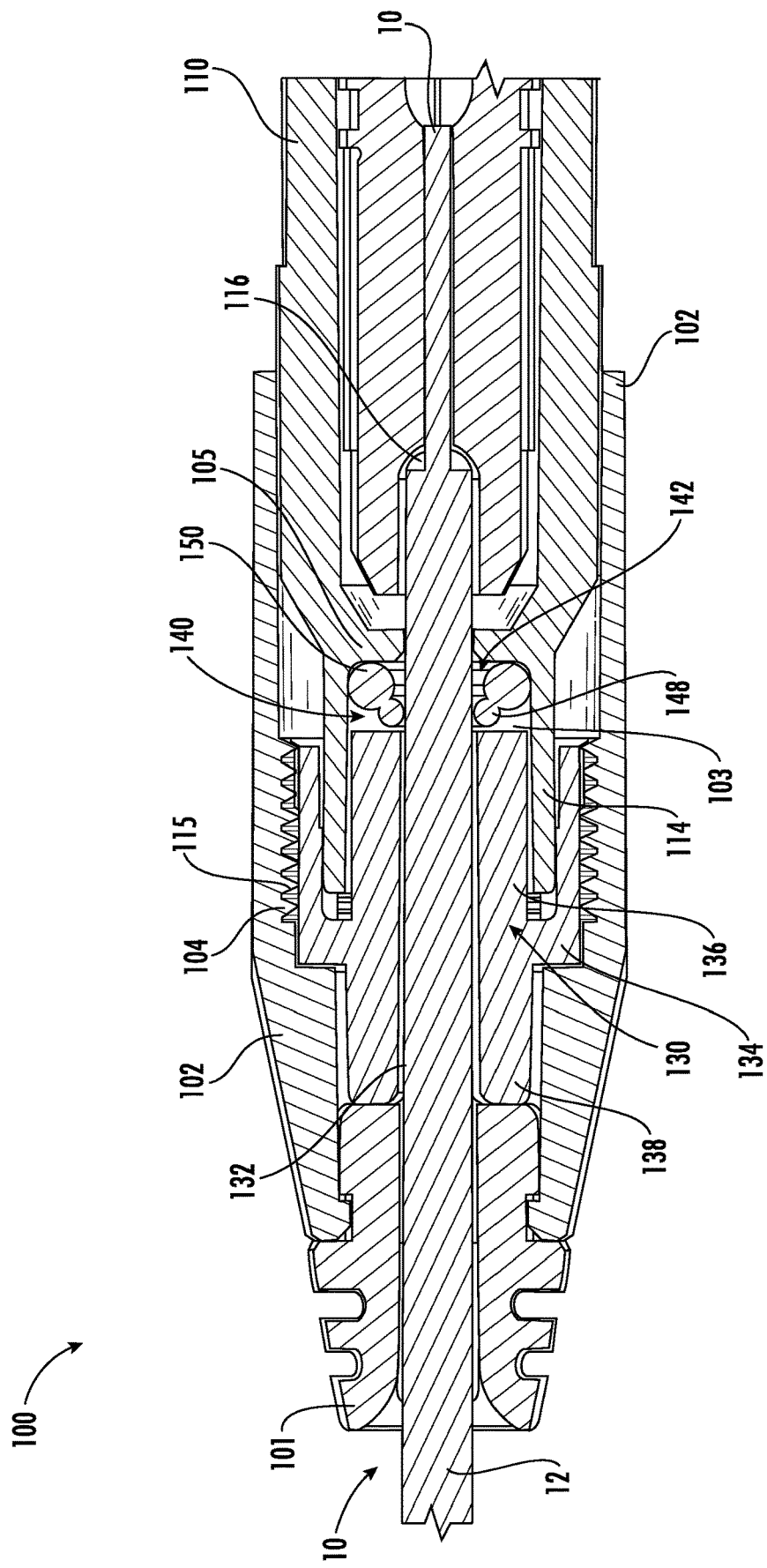
FIG. 11 is a cross sectional view of the connectorized cable assembly of FIG. 1 with the fiber optic cable connected therein according to embodiments of the present disclosure, with the cross section taken along lines 10-10 of FIG. 1.

Referring now to FIGS. 8 and 9, in addition to the gasket cable passage 142 at the body-engagement end 150 of the collapsing cantilevered gasket 140 being sized relatively larger than the gasket cable passage 142 at the pusher-engagement end 148 of the collapsing cantilevered gasket 140, the body-engagement end 150 extends laterally outward relative to the pusher-engagement end 148 such that the collapsing cantilevered gasket 140 has a greater cross-sectional profile along the body-engagement end 150 than the pusher-engagement end 148. The collapsing cantilevered gasket 140 is structurally configured to form an axially compressed sealing interface at the body-engagement end 150 of the collapsing cantilevered gasket 140 about the seal cavity 103, adjacent to the stop wall 105, and between the cable entry end 118 of the connector body 110 and the pusher 130 (FIG. 11). In particular, the pusher-engagement end 148 is configured to translate axially underneath the body-engagement end 150, in response to the pusher 130 axially engaging the pusher-engagement end 148, such that the pusher-engagement end 148 expands the body-engagement end 150 radially outward relative to the gasket cable passage 142 to thereby form the axially compressed sealing interface against the seal cavity 103.

Further, in addition to the collapsing cantilevered gasket 140 being structurally configured such that the cantilevered portion 146 at the pusher-engagement end 148 translates axially along the gasket cable passage 142 and underneath the body-engagement end 150, the body-engagement end 150 is structurally configured to simultaneously compress the pusher-engagement end 148 radially inward toward, and/or translate laterally across, the gasket cable passage 142, relative to the anchored portion 144 at the body-engagement end 150 of the collapsing cantilevered gasket 140. It should be understood that the body-engagement end 150 is configured to remain axially fixed along the gasket cable passage 142 as the pusher-engagement end 148 translates axially into and underneath the body-engagement end 150.

In this instance, the collapsing cantilevered gasket 140 is structurally configured to form an omnidirectionally compressed sealing interface at the pusher-engagement end 148 of the collapsing cantilevered gasket 140 between the cantilevered portion 146 and an outer surface 12 of the fiber optic cable 10 passing through the gasket cable passage 142 of the collapsing cantilevered gasket 140. The pusher-engagement end 148 is structurally configured to collapse against the outer surface 12 of the fiber optic cable 10 to form the omnidirectionally compressed sealing interface when the pusher 130 engages the connector body 110, with the collapsing cantilevered gasket 140 positioned between the pusher 130 and the stop wall 105 (FIG. 10) of the connector body 110, as the body-engagement end 150 squeezes the pusher-engagement end 148 inward toward the gasket cable passage 142 due to the position of the pusher-engagement end 148 underneath the body-engagement end 150. In embodiments, the collapsing cantilevered gasket 140 is formed of an elastic material such that the collapsing cantilevered gasket 140 is flexibly deformable. In the present example, the collapsing cantilevered gasket 140 comprises silicone or other elastic sealing materials that have suitable low-compression and flexibility. Accordingly, the collapsing cantilevered gasket 140 is configured to deform in response to pressure exerted on the collapsing cantilevered gasket 140.

Figure 10:
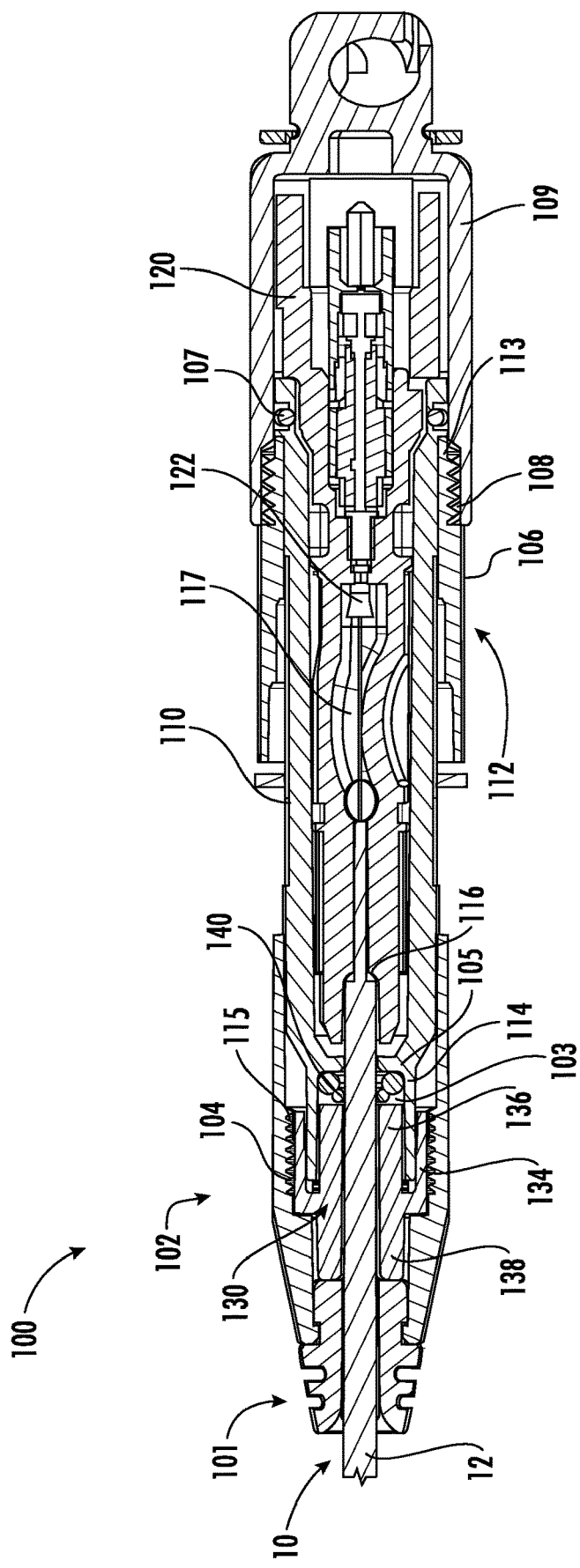
FIG. 10 is a cross sectional view of the connectorized cable assembly of FIG. 1 with the fiber optic cable connected therein according to embodiments of the present disclosure, with the cross section taken along lines 10-10 of FIG. 1.

Referring now to FIGS. 10 and 11, the fiber optic connector 100 is illustrated in an assembled configuration with the ferrule assembly 120 retained by the ferrule retaining portion 112 of the connector body 110 and the optical fiber bore 122 of the ferrule assembly 120 in alignment with the body cable passage 116 of the connector body 110. Further, the pusher 130 is axially engaged with the pusher engagement portion 114 of the connector body 110 such that the pusher cable passage 132 is in alignment with the body cable passage 116 of the connector body 110 and the optical fiber bore 122 of the ferrule assembly 120. In particular, the pair of latches 134 of the pusher 130 couples with the pair of protrusions 111 of the connector body 110 along the pusher engagement portion 114 of the connector body 110 as the pusher 130 is axially translated toward the pusher engagement portion 114 of the connector body 110. Further, the bias member 136 of the pusher 130 slidably translates within the seal cavity 103 of the connector body 110 as the pusher 130 axially translates toward the pusher engagement portion 114. It should be understood that the pusher 130 axially translates toward the pusher engagement portion 114 of the connector body 110 in response to the threaded portion 104 of the rear coupling nut 102 rotatably mating with the rear threaded portion 115 of the connector body 110. Accordingly, the pusher 130 translates axially toward the connector body 110 as the rear coupling nut 102 rotates and axially translates relative to the connector body 110.

Disposed between the bias member 136 of the pusher 130 and the stop wall 105 of the connector body 110 is the collapsing cantilevered gasket 140 received within the seal cavity 103 of the connector body 110. In this instance, the collapsing cantilevered gasket 140 is disposed within the pusher engagement portion 114 such that the gasket cable passage 142 is aligned with the body cable passage 116 of the connector body 110, the optical fiber bore 122 of the ferrule assembly 120, and the pusher cable passage 132 of the pusher 130. It should be understood that the fiber optic cable 10 is slidably received within the fiber optic connector 100 prior to the rear coupling nut 102 fully engaging the connector body 110, such that that the bias member 136 of the pusher 130 is not completely received within the pusher engagement portion 114 of the connector body 110 (i.e., the seal cavity 1103) and the collapsing cantilevered gasket 140 is not fully compressed against the stop wall 105 of the connector body 110 as a result.

As the fiber optic cable 10 is slidably translated through the pusher 130, the collapsing cantilevered gasket 140 and the connector body 110, the cantilevered portion 146 of the collapsing cantilevered gasket 140 may expand outwardly relative to the body cable passage 116 of the connector body 110 when the fiber optic cable 10 defines a larger diameter relative to the gasket cable passage 142. To securely seal the fiber optic cable 10 to the fiber optic connector 100, the rear coupling nut 102 is rotated relative to the connector body 110 with the fiber optic cable 10 received therein to thereby deform the collapsing cantilevered gasket 140 against the outer surface 12 of the fiber optic cable 10 and seal the fiber optic cable 10 to the fiber optic connector 100. With the inclusion of the collapsing cantilevered gasket 140 within the fiber optic connector 100, the fiber optic cable 10 is capable of being securely sealed to the fiber optic connector 100 without the use of an epoxy or other like substance.

In particular, as the pusher 130 axially translates toward, and engages with, the connector body 110, with the collapsing cantilevered gasket 140 positioned therebetween, the pusher-engagement end 148 of the collapsing cantilevered gasket 140 collapses against the outer surface 12 of the fiber optic cable 10 to form an omnidirectional compression against the fiber optic cable 10. In particular, the omnidirectional compression between the pusher-engagement end 148 and the outer surface 12 of the fiber optic cable 10 is formed in response to the bias member 136 axially translating toward and encountering the pusher-engagement end 148.

In particular, as the pusher 130 axially translates toward the connector body 110, and the bias member 136 compresses against the collapsing cantilevered gasket 140, the cantilevered portion 146 of the collapsing cantilevered gasket 140 at the pusher-engagement end 148 translates axially along the gasket cable passage 142 as the pusher-engagement end 148 is axially translated toward the body-engagement end 150. In this instance, the pusher-engagement end 148 translates axially underneath the body-engagement end 150, and the body-engagement end 150 thereby compresses the pusher-engagement end 148 radially inward toward the gasket cable passage 142.

In this instance, the cantilevered portion 146 of the collapsing cantilevered gasket 140, at the pusher-engagement end 148 translates laterally across the gasket cable passage 142 relative to the anchored portion 144 at the body-engagement end 150 when the pusher-engagement end 148 is axially compressed toward the body-engagement end 150, in response to the bias member 136 axially translating toward and encountering the pusher-engagement end 148 of the collapsing cantilevered gasket 140 and the body-engagement end 150 urging the pusher-engagement end 148 inward.

Simultaneously, the anchored portion 144 of the collapsing cantilevered gasket 140 at the body-engagement end 150 remains axially fixed along the gasket cable passage 142 when the pusher-engagement end 148 of the collapsing cantilevered gasket 140 is axially compressed toward the body-engagement end 150 by the bias member 136, in response to the pusher 130 translating toward the connector body 110. Simultaneously, the anchored portion 144 extends laterally outward away from the gasket cable passage 142, relative to the cantilevered portion 146 of the collapsing cantilevered gasket 140 at the pusher-engagement end 148, when the pusher-engagement end 148 is axially compressed toward the body-engagement end 150 by the bias member 136 of the pusher 130. In this instance, with the pusher-engagement end 148 positioned underneath the body-engagement end 150, the pusher-engagement end 148 urges the body-engagement end 150 to expand radially outwardly relative to the gasket cable passage 142 such that the omnidirectionally compressed sealing interface is formed between the seal cavity 103 and the body-engagement end 150.

In some embodiments, the axially compressed sealing interface and the omnidirectionally compressed sealing interface formed by the collapsing cantilevered gasket 140 with the outer surface 12 of the fiber optic cable 10 lie in parallel planes but are characterized by non-parallel directions of compression. Further, in some embodiments the axially compressed sealing interface is characterized by a direction of compression that is parallel to the gasket cable passage 142, and the omnidirectionally compressed sealing interface is characterized by a direction of compression that intersects the gasket cable passage 142.

In the present example, the pusher-engagement end 148 of the collapsing cantilevered gasket 140 is positioned within the seal cavity 103 proximate to the cable entry end 118, relative to the body-engagement end 150, and distal from the stop wall 105 of the connector body 110 relative to the body-engagement end 150, while the body-engagement end 150 of the collapsing cantilevered gasket 140 is positioned within the seal cavity 103 distal to the cable entry end 118 relative to the pusher-engagement end 148 and proximate to the stop wall 105 of the connector body 110 relative to the pusher-engagement end 148. It should be understood that in other embodiments the collapsing cantilevered gasket 140 may be positioned within the seal cavity 103 in alternative orientations. For example, in some embodiments, the collapsing cantilevered gasket 140 may be positioned within the seal cavity 103 such that the pusher-engagement end 148 of the collapsing cantilevered gasket 140 is positioned within the seal cavity 103 distal to the cable entry end 118, relative to the body-engagement end 150, and proximate to the stop wall 105 of the connector body 110 relative to the body-engagement end 150, while the body-engagement end 150 of the collapsing cantilevered gasket 140 is positioned within the seal cavity 103 proximate to the cable entry end 118 relative to the pusher-engagement end 148 and distal from the stop wall 105 of the connector body 110 relative to the pusher-engagement end 148. It should be understood that various other positions, orientations, and physical placement of the collapsing cantilevered gasket 140 within the seal cavity 103 may be possible.

Referring now to FIG. 12, it should be understood that the bias member 136 of the pusher 130 extends outwardly from the pusher 130 at a longitudinal length that is sized in accordance with a length of the seal cavity 103 of the connector body 110 and a width of the collapsing cantilevered gasket 140 received within the seal cavity 103. In this instance, the bias member 136 is sized and configured to compress the collapsing cantilevered gasket 140 as the pusher 130 axially translates toward the pusher engagement portion 114 of the connector body 110, and in particular, as the bias member 136 is received within the seal cavity 103 and axially translates toward the pusher-engagement end 148 of the collapsing cantilevered gasket 140.

Figure 14:
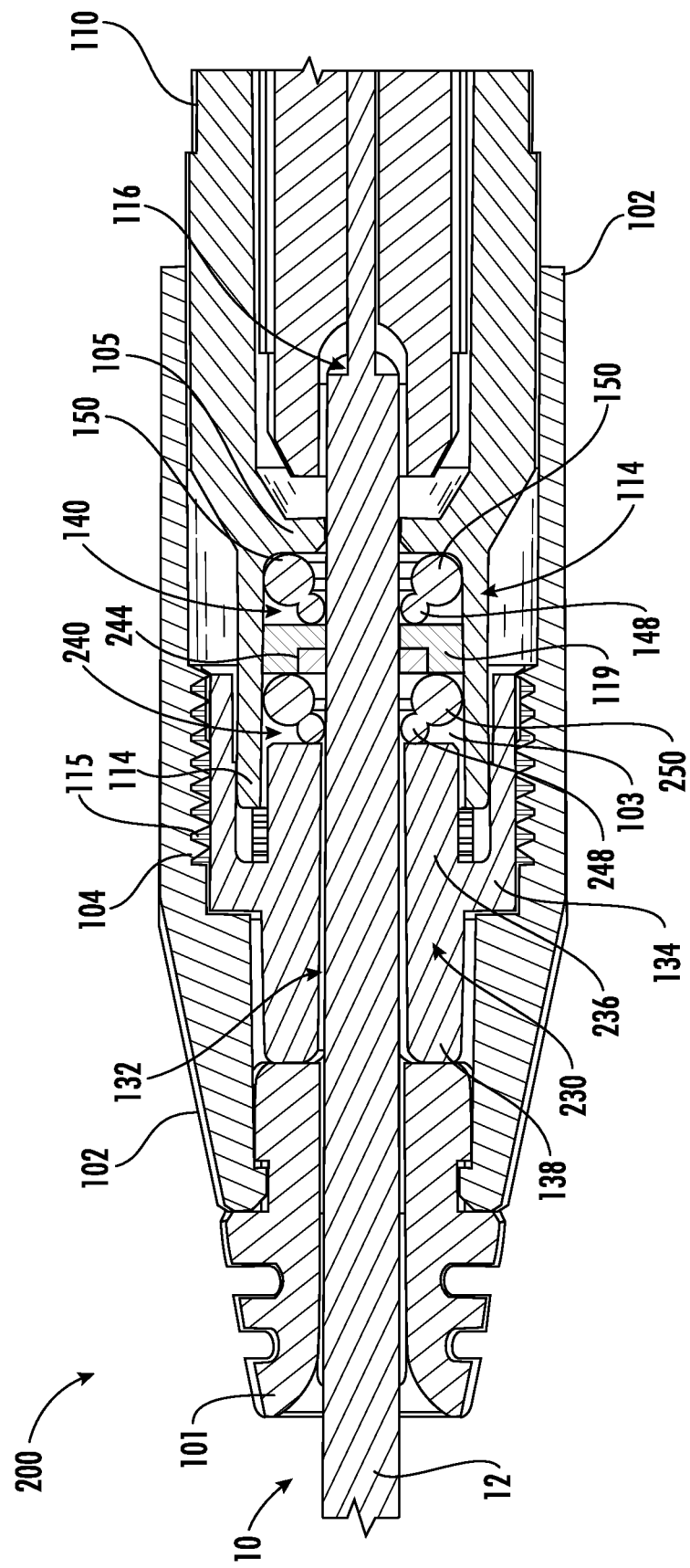
FIG. 14 is a cross section view of a fiber optic connector including a seal component according to embodiments of the present disclosure.

Referring now to FIG. 14, a fiber optic connector 200 is illustrated. The fiber optic connector 200 of this example may be configured and operable just like the fiber optic connector 100 described above, except for the differences explicitly noted herein, such that like reference numerals are used to identify like components. The fiber optic connector 200 is different than the fiber optic connector 100 described above in that a second collapsing cantilevered gasket 240 is disposed within the body cable passage 116 of the connector body 110, and a seal component 244 is disposed about the fiber optic cable 10. Second collapsing cantilevered gasket 240 is substantially similar to the collapsing cantilevered gasket 140 described above such that second collapsing cantilevered gasket 240 functions substantially similar to the collapsing cantilevered gasket 140 and the second collapsing cantilevered gasket 240 is configured to form sealing interfaces against the connector body 110 and the fiber optic cable 10 received therein in a substantially similar manner as described above with respect to the collapsing cantilevered gasket 140. Accordingly, like reference numerals of the collapsing cantilevered gasket 140 are used to identify like components of the second collapsing cantilevered gasket 240.

Similar to the collapsing cantilevered gasket 140, the second collapsing cantilevered gasket 240 comprises a gasket cable passage 142, an anchored portion 144 formed about the gasket cable passage 142 at a body-engagement end 150 of the second collapsing cantilevered gasket 240, and a cantilevered portion 146 formed about the gasket cable passage 142 at a pusher-engagement end 148 of the second collapsing cantilevered gasket 240.

The second collapsing cantilevered gasket 240 is structurally configured to be seated within the pusher engagement portion 114 of the connector body 110, and in particular, within the body cable passage 116 of the connector body 110 proximate to the collapsing cantilevered gasket 140. The connector body 110 of the fiber optic connector 200 comprises a gasket-divider 119 disposed within the pusher engagement portion 114 of the connector body 110, with the gasket-divider 119 comprising a divider cable passage that is sized and configured to receive the fiber optic cable 10 therethrough. The fiber optic connector 200, in an assembled configuration, comprises the second collapsing cantilevered gasket 240 received within the body cable passage 116 and separated from the collapsing cantilevered gasket 140 by the gasket-divider 119 of the connector body 110 positioned therebetween within the body cable passage 116.

In particular, the gasket-divider 119 is positioned against the pusher-engagement end 148 of the collapsing cantilevered gasket 140 and the body-engagement end 150 of the second collapsing cantilevered gasket 240. The second collapsing cantilevered gasket 240 is structurally configured to form an axially compressed sealing interface at the body-engagement end 150 of the second collapsing cantilevered gasket 240 about the body cable passage 116 between the cable entry end 118 and the gasket-divider 119 of the connector body 110. The second collapsing cantilevered gasket 240 is further structurally configured to form an omnidirectionally compressed sealing interface at the body-engagement end 150 of the second collapsing cantilevered gasket 240 between the cantilevered portion 146 and the outer surface 12 of the fiber optic cable 10 extending through the gasket cable passage 142 of the second collapsing cantilevered gasket 240.

Figure 13:
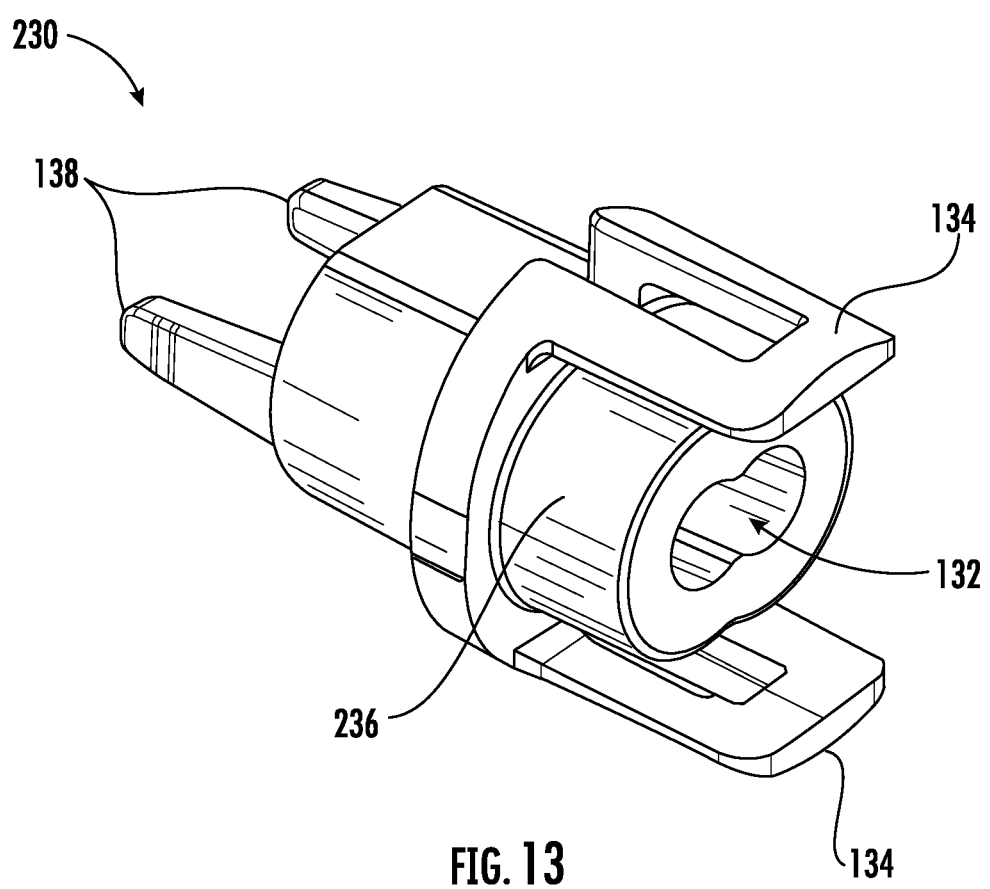
FIG. 13 is an isometric view of an alternative pusher including a gasket bias member according to embodiments of the present disclosure.

Referring now to FIG. 13, the fiber optic connector 200 further comprises a pusher 230 that is configured and operable just like the pusher 130 described above, except for the differences explicitly noted herein, such that like reference numerals are used to identify like components. In particular, the pusher 230 comprises latches 234, and a bias member 236 that extends outwardly from the pusher 230 at a longitudinal length that is sized in accordance with a length of the body cable passage 116 of the connector body 110, a width of the collapsing cantilevered gasket 140, a width of the second collapsing cantilevered gasket 240, and a width of the gasket-divider 119 received within the body cable passage 116. Accordingly, the bias member 236 of the pusher 230 of the present example is relatively smaller than the bias member 136 of the pusher 130 described above due to the inclusion of the second collapsing cantilevered gasket 240 and the gasket-divider 119 within the pusher engagement portion 114 of the connector body 110.

In this instance, the bias member 236 is sized and configured to compress the pusher-engagement end 148 of the second collapsing cantilevered gasket 240 and, through the gasket-divider 119, the pusher-engagement end 148 of the collapsing cantilevered gasket 140 as the pusher 230 axially translates toward the pusher engagement portion 114 of the connector body 110, and in particular, as the bias member 236 is received within the body cable passage 116 and axially translates toward the collapsing cantilevered gaskets 140, 240.

Figure 15:
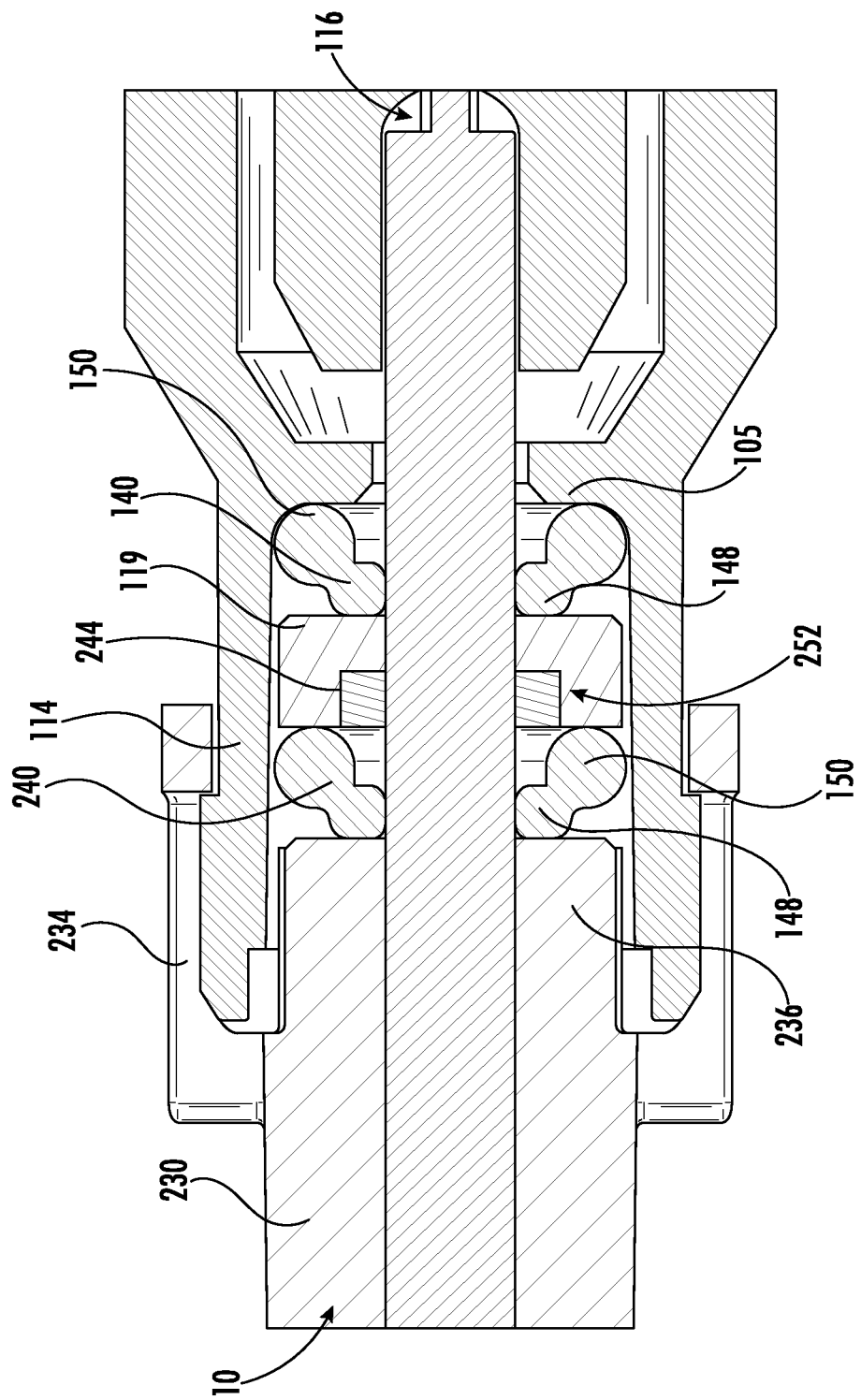
FIG. 15 is an isolated cross section view of the fiber optic connector shown in FIG. 14 illustrating the seal component.

FIG. 15 is an isolated view of the fiber optic connector 200, illustrating the seal component 244 of the fiber optic connector 200 located between the collapsing cantilevered gaskets 140, 240. The seal component 244 is disposed about the fiber optic cable 10 and disposed within a cavity 252 in the gasket-divider 119. The seal component 244 can have an annular, hoop-like structure that conforms relatively tightly to the fiber optic cable 10, and can have an interference fit with the fiber optic cable 10 exterior. The cavity 252 within the gasket-divider 119 can, in combination with the exterior of the fiber optic cable 10, can also define a generally annular space that accommodates the seal component 244.

The seal component 244 can include one or more materials configured to absorb liquids that to enhance sealing in the cable assembly. For example, the seal component 244 can include some form of superabsorbent material such as a superabsorbent polymer (SAP). The seal component 244 could include, for example, a holt-melt superabsorbent polymer retained within the cavity 252. As used herein, the term "superabsorbent" refers to a material that is capable in its dry form of spontaneously absorbing at least 20 times its own weight of aqueous fluid, in particular of water and especially distilled water. Superabsorbent materials may include superabsorbent polymers and superabsorbent gels. Such superabsorbent materials are described in the publication "Absorbent polymer technology, Studies in polymer science 8" by L. Brannon-Pappas and R. Harland, published by Elsevier, 1990. Superabsorbent materials have a large capacity for absorbing and retaining water and aqueous fluids. After absorption of an aqueous liquid, the superabsorbent particles thus engorged with aqueous fluid remain insoluble in the aqueous fluid and thus conserve their individualized particulate state. A superabsorbent material may have a water-absorbing capacity ranging from 20 to 2000 times its own weight (i.e., 20 g to 2000 g of absorbed water per gram of absorbent material), preferably from 30 to 1500 times and better still from 50 to 1000 times. These water absorption characteristics are defined under standard temperature (25° C.) and pressure (760 mmHg, i.e., 100,000 Pa) conditions and for distilled water.

Hot-melt SAP can be pre-molded to form a seal component 244 having various shapes, such as an annular shape to be disposed over the fiber optic cable 10. The annular shape can be continuous, or can include a slot (not shown) so that the annulus is discontinuous, and so that the seal component 244 can be pressed onto the fiber optic cable 10 from a transverse direction via the slot.

Hot-melt SAP can also be applied to the exterior of a solid "substrate" component rather than forming the entirety of the seal component 244 from superabsorbent material. In this embodiment, the seal component 244 can have an interior or substrate of a conventional polymer such as plastic, rubber or other solid material having an annular shape or some other shape. The exterior of the seal component 244 could be formed from solidified or at least partially solidified hot-melt SAP applied to the substrate. A substrate could also be used to support SAP particles embedded in its surface during forming of the substrate, such as is shown in U.S. Pat. No. 5,388,175, the entire contents of which are hereby incorporated by reference.

In the illustrated embodiment, the gasket-divider 119 serves the dual purposes of transferring forces in effecting a seal, as well as housing the seal component 244 to enhance the physical seal. Water that bypasses the outboard seal comes into contact with the seal component 244, which then expands to seal the leak path. Additionally, expansion of the seal component 244 caused by exposure to liquid increases the sealing pressure on the two primary seals, further enhancing the sealing.

Figure 16:
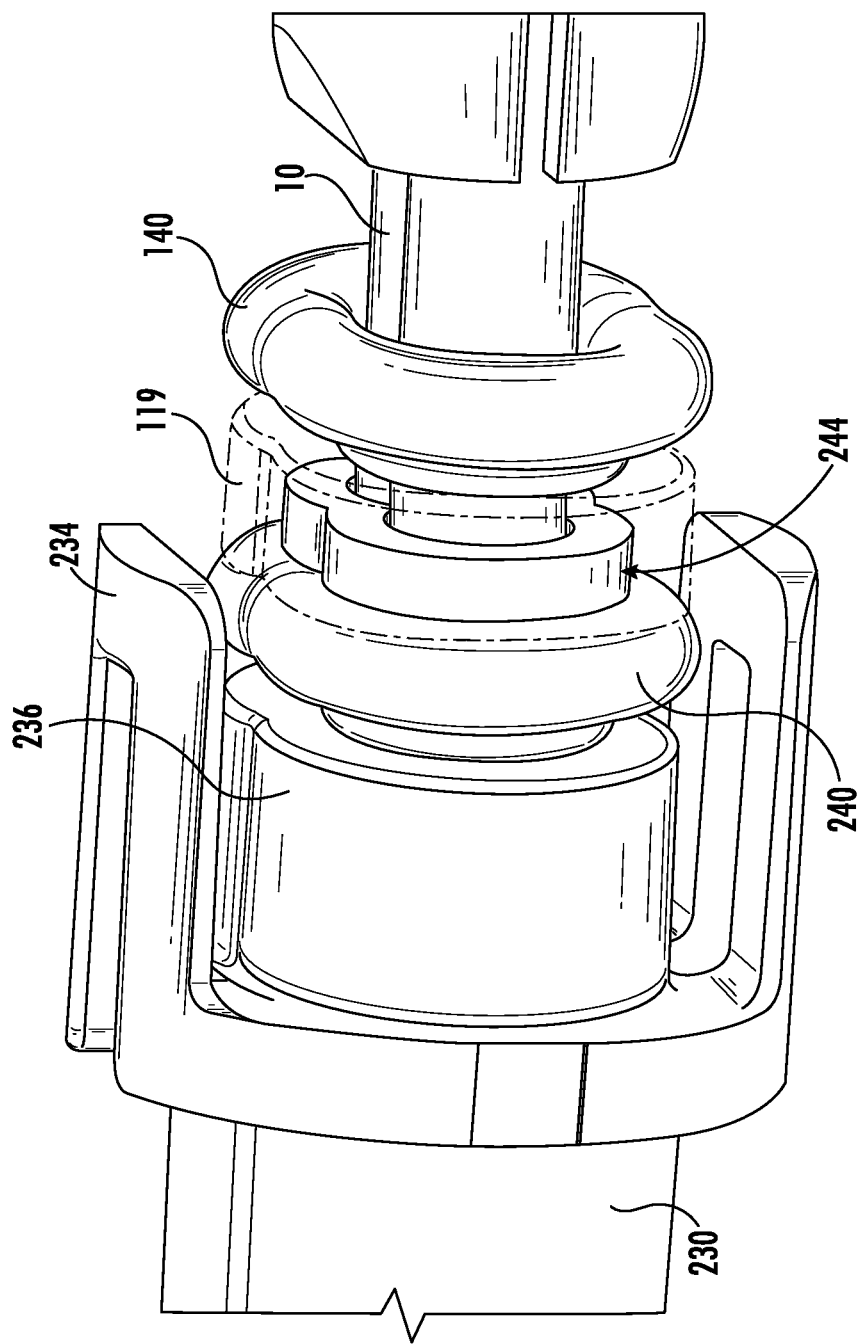
FIG. 16 is an isolated isometric view of the fiber optic connector shown in FIG. 14.
Figure 17:
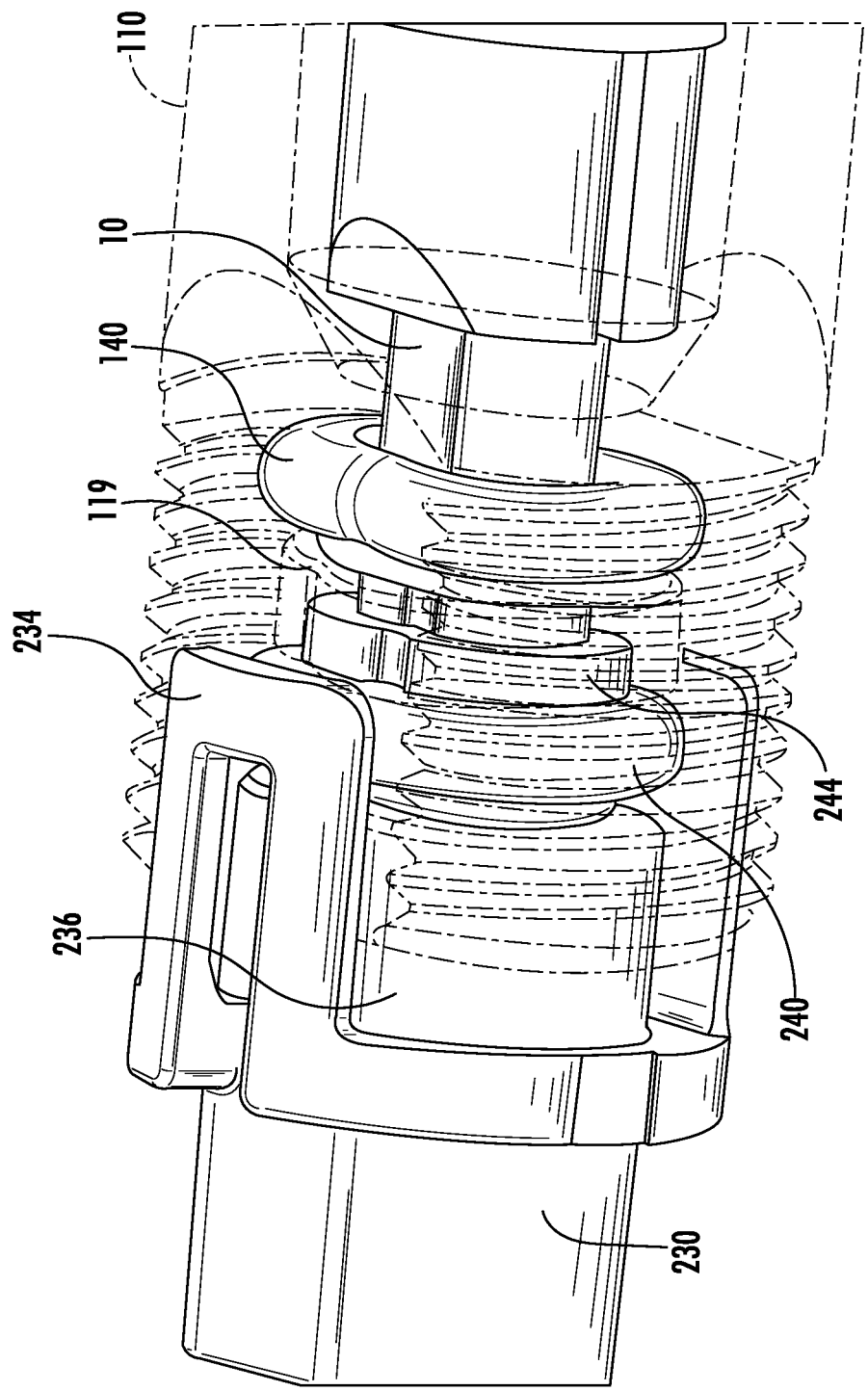
FIG. 17 is an isolated isometric view of a portion of the fiber optic connector shown in FIG. 14.

FIG. 16 is an isolated, isometric view of a portion of the fiber optic connector 200 illustrating the seal component 244 of the fiber optic connector 200 housing. In FIG. 16, the gasket-divider 119 is partially transparent to illustrate the orientation of the seal component 244 within the gasket-divider 119. FIG. 17 illustrates the fiber optic connector 200 in an assembled state with portions of the fiber optic connector 200 partially transparent to illustrate the location of the orientation of the seal component 244 within the gasket-divider 119. Additionally, the connector body 110 depicted in FIG. 17 has a portion removed for clarity to observe the location of seal component 244 and gasket-divider 119.

Figure 18:
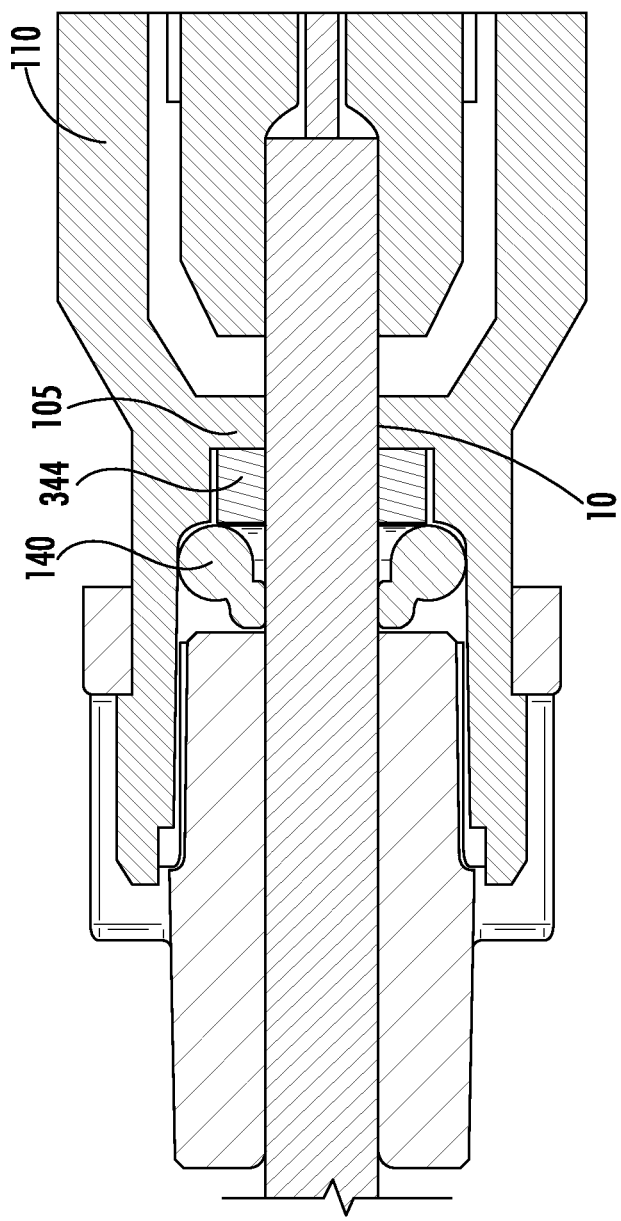
FIG. 18 is an isolated isometric view of a fiber optic connector similar to the connector shown in FIG. 11, but also including a seal component according to embodiments of the present disclosure.

FIG. 18 is an isolated view of a fiber optic connector 400 similar to the fiber optic connector 100 shown in FIG. 11, but also including a seal component 344 abutting the collapsing cantilevered gasket 140 and the stop wall 105. The seal component 344 can be similar in structure and operation to the embodiments of the seal component 244 disclosed herein.

FIGS. 19 and 20A-20C illustrate an embodiment including only a seal component 444 and no additional or primary seal. In this embodiment, the seal plunger now only acts as a retainer, although it could serve to compress the seal component 444 to form an initial seal. The seal component 444 has a generally annular shape and defines a bore 448 that can be structurally configured to receive a fiber optic cable 10.

Figure 20:
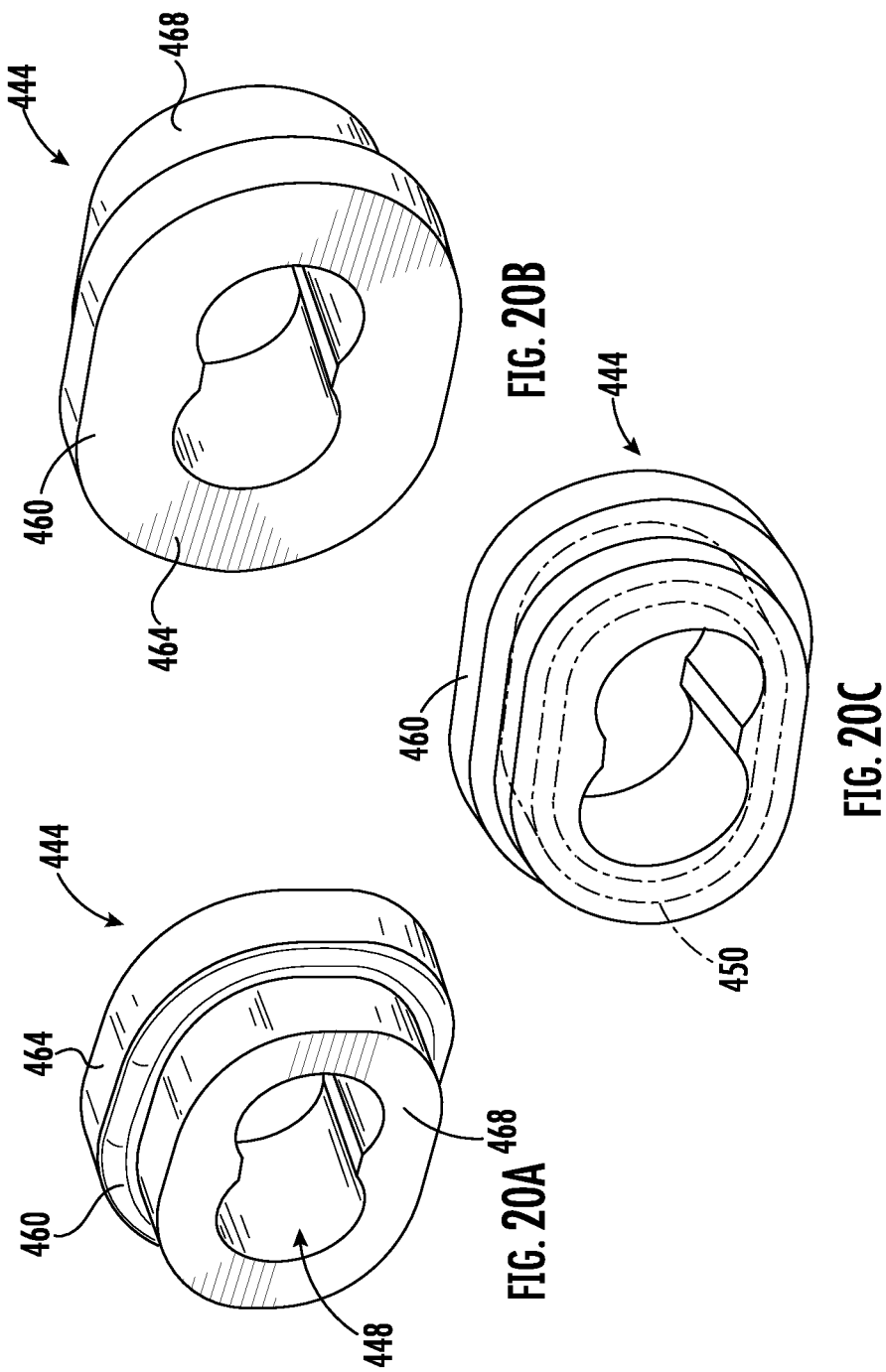
FIGS. 20A-20C illustrate the seal component of the fiber optic connector shown in FIG. 19.

Referring to FIG. 20C, in which the seal component 444 is partially transparent, the seal component 444 can be formed from, for example, a substrate 450 coated in superabsorbent hot-melt material 460. Applying superabsorbent material 460 over a relatively rigid substrate, such as rubber or a polymer such as plastic, allows a wider range of more effective superabsorbent hot-melt materials to be used, such as those with less structural integrity than the substrate. When the seal component 444 is exposed to liquid, expansion of the component seals water out of the connector.

Figure 19:
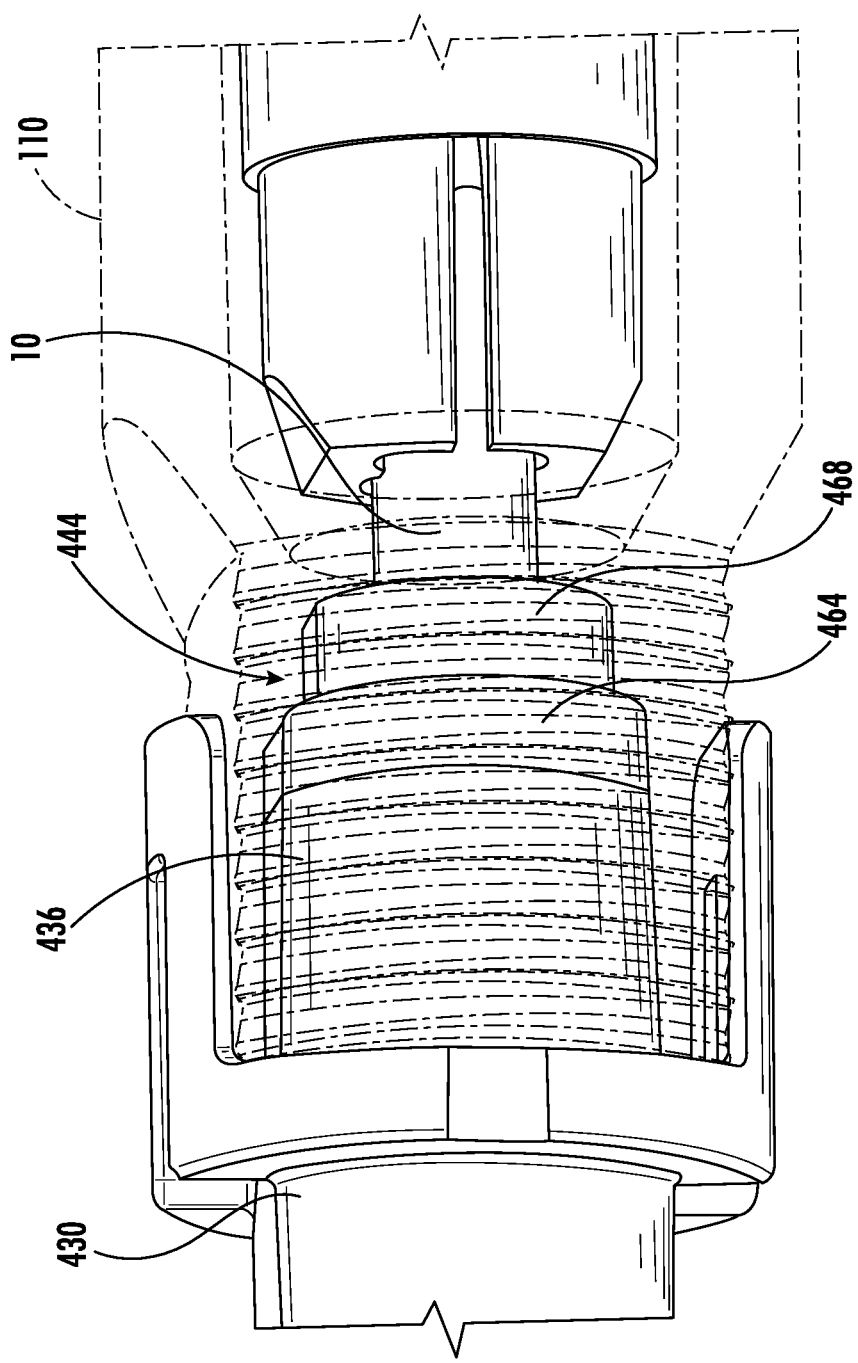
FIG. 19 is a partial isometric view of a fiber optic connector having a primary seal component including superabsorbent material.

The seal component 444 comprises generally a first section 464 that has a larger plan surface area than the second section 468. The first and second sections 464, 468 can be formed as, for example, a one-piece or monolithic structure. The larger, first section 464 is configured to engage the bias section 436 of a pusher 430, as shown in FIG. 19.

Figure 21:
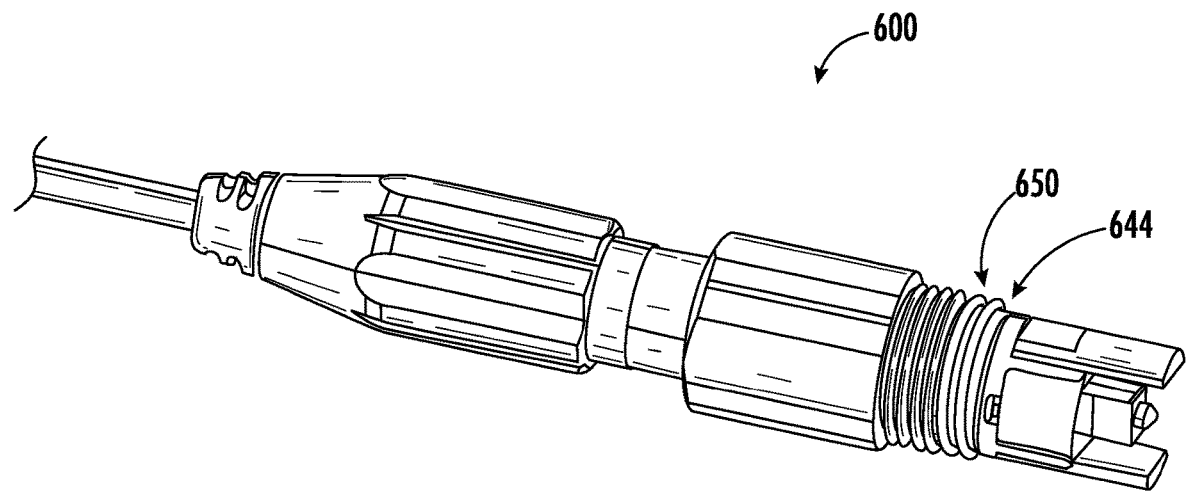
FIG. 21 is an isometric view of a connector having a seal component with superabsorbent material disposed at the front end of the connector.

FIG. 21 illustrates a connector 600 having a seal component 644 including superabsorbent material disposed at the front end of connector 600, adjacent to a conventional o-ring seal 650. The seal component 644 and the o-ring seal 650 may be arranged within grooves on the body of connector 600 in order to keep the seal component 644 and the o-ring seal 650 in place. Conventional o-rings may leak such as due to wear experienced during frequent matings, and the seal component 644 can act to wholly or partially compensate for leaks that would be experienced by conventional seals.

Figure 22:
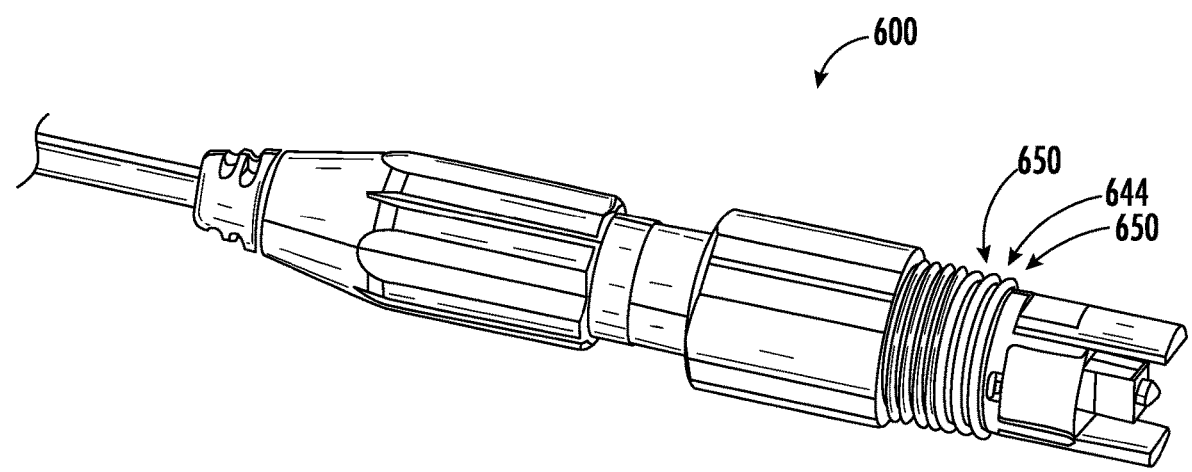
FIG. 22 is an isometric view of a connector having a seal component with superabsorbent material disposed between two conventional o-ring seals at the front end of the connector.

FIG. 22 illustrates an embodiment in which the seal component 644 is disposed between two conventional o-ring seals 650. The seal component 644 and the o-ring seals 650 may be arranged within grooves on the body of connector 600 in order to keep the seal component 644 and the o-ring seals 650 in place.

In the above embodiments, the seal components could be formed from materials such as a fibrous (for example fibers, tapes, and fabrics) material, such as a tape coated and/or impregnated with SAP material. Loose SAP may also be used, such as if loose SAP powder is retained within a cavity, such as the cavity 252 in FIG. 15. The various seal components disclosed herein can also be used individually or in combination with other superabsorbent seal components described herein.

Superabsorbent polymers used in the present embodiments can include materials such as, for example, sodium or potassium sodium acrylate or acrylamide copolymers, cross-linked carboxymethylcellulose, ethylene maleic anhydride copolymers, cross-linked polyethylene oxide, polyvinyl alcohol copolymers, or starch-grafted copolymers of polyacrylonitrile. The superabsorbent portion of the seal components can also comprise combinations of different materials applied to a substrate such as a tape. A combination of polyacrylamide-acrylate copolymer and polyacrylate superabsorbent, for example, provides functionality of the seal component in standard applications, salt-water applications, or both. According to one embodiment, the superabsorbent polymer is capable of absorbing at least 50 grams of water per gram of superabsorbent polymer, and can further be capable of absorbing at least 50 grams of water per gram of superabsorbent polymer.

Tables 1 and 2, below, provide examples of the water absorption capabilities of four SA-SHM (referred to individually as "SHM1," "SHM2," "SHM3," and "SHM4") that can be used as the superabsorbent materials, such as coatings, according to the exemplary embodiments. Certain SA-SHM capabilities are compared against a standard SAP powder (referred to as "SAP1"). In particular, SHM1 is commercially available as NW1117 from H.B. Fuller Company, Vadnais Heights, Minn. SHM2 is commercially available as NW1120B from H.B. Fuller Company of Vadnais Heights, Minn. SHM3 is commercially available as HM002 from Stewart Superabsorbents of Hickory, N.C. SHM4 is commercially available as HM008 from Stewart Superabsorbents of Hickory, N.C. SAP1 is a powderized sodium acrylate polymer having particles with average size of about 63 microns (commercially available from Stewart Superabsorbents). All experiments were performed at room temperature of about 22° C.

The data displayed in Table 1 demonstrates the water absorption capacities of SHM1 and SHM2 as compared to SAP1. In particular, particles of SAP1 and sections of SHM1 and SHM2 were placed in a beaker. The masses of each beaker before and after the addition of SAP1, SHM1, and SHM2 were determined so as to calculate the amount of each material added. A filter as then placed over the beaker, and the mass of the beaker/material/filter combination was determined. Water was added to the beaker, and the materials were given time to absorb as much water as they could. Any remaining, unabsorbed water was drained from the beaker, and the mass of the beaker/material/filter/absorbed water was determined. As can be seen from Table 1, SHM1 and SHM2 absorbed more water on a per gram basis than SAP1.

TABLE 1

Water absorption capacity of SHM Materials compared to SAP Powder

| Material | SAP1 | SHM2 | SHM1 |
|---|---|---|---|
| Mass of Beaker + Stir Bar (g) | 129.70 | 70.10 | 136.15 |
| Mass of Beaker + Stir Bar + SHM Material (g) | 129.84 | 70.23 | 136.32 |
| Mass of SHM Material (g) | 0.14 | 0.13 | 0.17 |
| Mass of Beaker + Filter Assembly (g) | 156.80 | 157.05 | 150.62 |
| Mass of Beaker + Filter Assembly + Swollen Gel (g) | 181.64 | 179.24 | 180.56 |
| Mass of Water Absorbed (g) | 24.69 | 22.05 | 29.76 |
| Mass of Water Absorbed/Mass of SHM Material (g/g) | 165.69 | 167.81 | 175.06 |

TABLE 2

Water absorption capacity of SHM materials

| Material | SHM3 | SHM4 | SAP1 |
|---|---|---|---|
| Mass of Glass Slide (g) | 9.272 | 9.263 | 9.263 |
| Mass of Glass Slide + Material (g) | 9.347 | 9.348 | 9.348 |
| Mass of Glass Slide + Gelled Material (g) | 19.468 | 19.650 | 19.650 |
| Mass of Material (g) | 0.075 | 0.085 | 0.082 |
| Mass of Water Absorbed (g) | 10.121 | 10.302 | 10.305 |
| Mass of Water Absorbed/Mass of Gelled Material (g/g) | 135.66 | 121.06 | 125.67 |

The data displayed in Table 2 demonstrates the water absorption capacities of SHM3 and SHM4 as compared to SAP1. In this experiment, the materials were placed on a glass slide. Each of the glass slides were weighed before and after the materials were placed thereon to determine the mass of each material deposited. Water was then added dropwise on the materials over a time up to 10 minutes and until it was visually observed that the material was saturated and the extra water dripped off. The glass slides with gelled material were then weighed to determine the amount of water absorbed. As can be seen in Table 2, SHM3 and SHM4 performed as well or better than SAP1 in terms of water absorbed on a per gram basis.

It is noted that recitations herein of a component of the present disclosure being "structurally configured" in a particular way, to embody a particular property, or to function in a particular manner, are structural recitations, as opposed to recitations of intended use. More specifically, the references herein to the manner in which a component is "structurally configured" denotes an existing physical condition of the component and, as such, is to be taken as a definite recitation of the structural characteristics of the component.

According to a first aspect, a fiber optic connector may include a connector body, a ferrule assembly, a pusher, at least one gasket, and at least one seal. The connector body may include a ferrule retaining portion, a pusher engagement portion, and a body cable passage extending from a cable entry end of the connector body to the ferrule retaining portion of the connector body along a longitudinal axis extending through the pusher engagement portion of the connector body and the ferrule retaining portion of the connector body. The ferrule assembly may include an optical fiber bore, where the ferrule assembly is structurally configured to be retained by the ferrule retaining portion of the connector body with the optical fiber bore of the ferrule assembly in alignment with, or offset from and aligned with, the longitudinal axis of the connector body. The pusher may include a pusher cable passage, where the pusher is structurally configured to axially engage the pusher engagement portion of the connector body with the pusher cable passage in alignment with the body cable passage of the connector body. The at least one gasket may be located between the cable entry end of the connector body and the pusher. The at least one seal component may include a superabsorbent material.

Another aspect includes a fiber optic connector according to any of the previous aspects, the at least one seal component may include a superabsorbent polymer.

Another aspect includes a fiber optic connector according to any of the previous aspects, the superabsorbent polymer may include a superabsorbent gel.

Another aspect includes a fiber optic connector according to any of the previous aspects, the at least one seal component may include a substrate, where the superabsorbent gel may be disposed on an exterior of the substrate.

Another aspect includes a fiber optic connector according to any of the previous aspects, the at least one seal component may include a substrate, where the superabsorbent polymer may be at least partially embedded in an exterior of the substrate.

Another aspect includes a fiber optic connector according to any of the previous aspects, the at least one seal component may include a fibrous material on which the superabsorbent material is supported.

Another aspect includes a fiber optic connector according to any of the previous aspects, the superabsorbent polymer may be at least partially in powder form.

Another aspect includes a fiber optic connector according to any of the previous aspects, the at least one seal component may have an annular shape.

Another aspect includes a fiber optic connector according to any of the previous aspects, the at least one seal component may abut the at least one gasket.

Another aspect includes a fiber optic connector according to any of the previous aspects, the at least one gasket may include a first gasket and a second gasket, the at least one seal component being disposed between the first gasket and the second gasket.

Another aspect includes a fiber optic connector according to any of the previous aspects, further comprising a divider disposed between the first gasket and the second gasket, where the at least one seal component may abut the divider.

Another aspect includes a fiber optic connector according to any of the previous aspects, the at least one seal component may be at least partially disposed within a cavity of the divider, and the divider may abut the first gasket and second gasket.

Another aspect includes a fiber optic connector according to any of the previous aspects, a bias member of the pusher may abut the first gasket.

Another aspect includes a fiber optic connector according to any of the previous aspects, the at least one seal component is disposed at a front end of the connector.

Another aspect includes a fiber optic connector according to any of the previous aspects, the at least one seal component may have an o-ring shape.

Another aspect includes a fiber optic connector according to any of the previous aspects, further comprising at least one o-ring seal disposed adjacent to the at least one seal component.

Another aspect includes a fiber optic connector according to any of the previous aspects, the at least one o-ring seal may include two o-ring seals, and the at least one seal component may be disposed between the two o-ring seals.

Another aspect includes a fiber optic connector according to any of the previous aspects, the at least one gasket may include a collapsing cantilevered gasket including a gasket cable passage, an anchored portion formed about the gasket cable passage at a body-engagement end of the gasket, and a cantilevered portion formed about the gasket cable passage at a pusher-engagement end of the gasket.

Another aspect includes a fiber optic connector according to any of the previous aspects, the collapsing cantilevered gasket may be structurally configured to form an axially compressed sealing interface at the body engagement end of the gasket about the body cable passage, between the cable entry end of the connector body and the pusher, and an omnidirectionally compressed sealing interface at the pusher-engagement end of the gasket between the cantilevered portion of the gasket and an outer surface of a cable passing through the gasket cable passage of the gasket.

According to a second aspect, a connectorized cable assembly may include a fiber optic cable, a connector body, a ferrule assembly, a pusher, at least one gasket, and at least one seal component. The fiber optic cable may include an outer surface. The connector body may include a ferrule retaining portion, a pusher engagement portion, and a body cable passage extending from a cable entry end of the connector body to the ferrule retaining portion of the connector body along a longitudinal axis extending through the pusher engagement portion of the connector body and the ferrule retaining portion of the connector body, where the body cable passage receives the fiber optic cable. The ferrule assembly may include an optical fiber bore retaining the fiber optic cable, where the ferrule assembly is retained by the ferrule retaining portion of the connector body with the optical fiber bore of the ferrule assembly being parallel to the longitudinal axis of the connector body. The pusher may include a pusher cable passage receiving the fiber optic cable therethrough, where the pusher axially engages the pusher engagement portion of the connector body with the pusher cable passage in alignment with the body cable passage of the connector body. The at least one seal component adjacent to the gasket may include a superabsorbent material.

Another aspect includes a connectorized cable assembly according to any of the previous aspects, the at least one seal component may include a superabsorbent polymer.

Another aspect includes a connectorized cable assembly according to any of the previous aspects, the superabsorbent polymer may include a superabsorbent gel.

Another aspect includes a connectorized cable assembly according to any of the previous aspects, the at least one seal component may include a substrate, where the superabsorbent gel may be disposed on an exterior of the substrate.

Another aspect includes a connectorized cable assembly according to any of the previous aspects, the at least one seal component may include a substrate, where the superabsorbent polymer may be at least partially embedded in an exterior of the substrate.

Another aspect includes a connectorized cable assembly according to any of the previous aspects, the at least one seal component may include a fibrous material on which the superabsorbent polymer may be supported.

Another aspect includes a connectorized cable assembly according to any of the previous aspects, the superabsorbent polymer may be at least partially in powder form.

Another aspect includes a connectorized cable assembly according to any of the previous aspects, the at least one seal component may have an annular shape.

Another aspect includes a connectorized cable assembly according to any of the previous aspects, the at least one seal component may abut the at least one gasket.

Another aspect includes a connectorized cable assembly according to any of the previous aspects, the at least one gasket may include a first gasket and a second gasket, the at least one seal component being may be disposed between the first gasket and the second gasket.

Another aspect includes a connectorized cable assembly according to any of the previous aspects, further comprising a divider disposed between the first gasket and the second gasket, where the at least one seal component may abut the divider.

Another aspect includes a connectorized cable assembly according to any of the previous aspects, the at least one seal component may be at least partially disposed within a cavity of the divider, and the divider may abut the first gasket and second gasket.

Another aspect includes a connectorized cable assembly according to any of the previous aspects, a bias member of the pusher may abut the first gasket.

Another aspect includes a connectorized cable assembly according to any of the previous aspects, the at least one seal component may be disposed at a front end of the connector.

Another aspect includes a connectorized cable assembly according to any of the previous aspects, the at least one seal component may have an o-ring shape.

Another aspect includes connectorized cable assembly according to any of the previous aspects, further comprising at least one o-ring seal disposed adjacent to the at least one seal component.

Another aspect includes a connectorized cable assembly according to any of the previous aspects, the at least one o-ring seal may include two o-ring seals, and where the at least one seal component may be disposed between the o-ring seals.

According to a third aspect, a fiber optic connector may include a connector body, a ferrule assembly, a pusher, and at least one seal component. The connector body may include a ferrule retaining portion, a pusher engagement portion, and a body cable passage extending from a cable entry end of the connector body to the ferrule retaining portion of the connector body along a longitudinal axis extending through the pusher engagement portion of the connector body and the ferrule retaining portion of the connector body. The ferrule assembly may include an optical fiber bore, where the ferrule assembly is structurally configured to be retained by the ferrule retaining portion of the connector body with the optical fiber bore of the ferrule assembly in alignment with, or offset from and aligned with, the longitudinal axis of the connector body. The pusher may include a pusher cable passage, where the pusher is structurally configured to axially engage the pusher engagement portion of the connector body with the pusher cable passage in alignment with the body cable passage of the connector body. The at least one seal component may abut the pusher and may include a superabsorbent material.

Another aspect includes a fiber optic connector according to any of the previous aspects, the at least one seal component may include a superabsorbent polymer.

Another aspect includes a fiber optic connector according to any of the previous aspects, the superabsorbent polymer may include a superabsorbent gel.

Another aspect includes a fiber optic connector according to any of the previous aspects, the at least one seal component may include a substrate, where the superabsorbent gel may be disposed on an exterior of the substrate.

Another aspect includes a fiber optic connector according to any of the previous aspects, the at least one seal component may include a substrate, where the superabsorbent polymer is at least partially embedded in an exterior of the substrate.

Another aspect includes a fiber optic connector according to any of the previous aspects, the superabsorbent polymer may be at least partially in powder form.

Another aspect includes a fiber optic connector according to any of the previous aspects, the at least one seal component may have a generally annular shape.

Another aspect includes a fiber optic connector according to any of the previous aspects, a bias member of the pusher may abut the at least one seal component.

Another aspect includes a fiber optic connector according to any of the previous aspects, the at least one seal component may include a first section and a second section, where the first section may have a larger plan cross-sectional area than the first section.

Another aspect includes a fiber optic connector according to any of the previous aspects, the first section may abut the pusher.

Another aspect includes a fiber optic connector according to any of the previous aspects, the at least one seal component may define a bore.

Another aspect includes a fiber optic connector according to any of the previous aspects, the first section and the second section may be a monolithic structure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A fiber optic connector, comprising:
    a connector body comprising a ferrule retaining portion, a pusher engagement portion, and a body cable passage extending from a cable entry end of the connector body to the ferrule retaining portion of the connector body along a longitudinal axis extending through the pusher engagement portion of the connector body and the ferrule retaining portion of the connector body;
    a ferrule assembly comprising an optical fiber bore, wherein the ferrule assembly is structurally configured to be retained by the ferrule retaining portion of the connector body with the optical fiber bore of the ferrule assembly in alignment with, or offset from and aligned with, the longitudinal axis of the connector body;
    a pusher comprising a pusher cable passage, wherein the pusher is structurally configured to axially engage the pusher engagement portion of the connector body with the pusher cable passage in alignment with the body cable passage of the connector body;
    at least one gasket located between the cable entry end of the connector body and the pusher, wherein the gasket comprises a gasket cable passage shaped to accommodate and receive a fiber optic cable, the gasket cable passage having two distinct strength member passageways arranged to approximate an elliptic Booth lemniscate; and
    at least one seal component comprising a superabsorbent material.

2. The fiber optic connector of claim 1, wherein the at least one seal component comprises a superabsorbent polymer.

3. The fiber optic connector of claim 2, wherein the superabsorbent polymer comprises a superabsorbent gel.

4. The fiber optic connector of claim 3, wherein the at least one seal component comprises a substrate, wherein the superabsorbent gel is disposed on an exterior of the substrate.

5. The fiber optic connector of claim 2, wherein the at least one seal component comprises a substrate, wherein the superabsorbent polymer is at least partially embedded in an exterior of the substrate.

6. The fiber optic connector of claim 2, wherein the at least one seal component further comprises a fibrous material on which the superabsorbent material is supported.

7. The fiber optic connector of claim 2, wherein the superabsorbent polymer is at least partially in powder form.

8. The fiber optic connector of claim 1, wherein the at least one seal component has an annular shape.

9. The fiber optic connector of claim 8, wherein the at least one seal component abuts the at least one gasket.

10. The fiber optic connector of claim 1, wherein the at least one gasket comprises a first gasket and a second gasket, the at least one seal component being disposed between the first gasket and the second gasket.

11. The fiber optic connector of claim 10, further comprising a divider disposed between the first gasket and the second gasket, wherein the at least one seal component abuts the divider.

12. The fiber optic connector of claim 11, wherein the at least one seal component is at least partially disposed within a cavity of the divider, and the divider abuts the first gasket and second gasket.

13. The fiber optic connector of claim 10, wherein a bias member of the pusher abuts the first gasket.

14. The fiber optic connector of claim 2, wherein the at least one seal component is disposed at a front end of the connector.

15. The fiber optic connector of claim 14, wherein the at least one seal component has an o-ring shape.

16. The fiber optic connector of claim 15, further comprising at least one o-ring seal disposed adjacent to the at least one seal component, wherein the at least one o-ring seal comprises two o-ring seals, and wherein the at least one seal component is disposed between the two o-ring seals.

17. The fiber optic connector of claim 1, wherein the at least one gasket comprises a collapsing cantilevered gasket comprising a gasket cable passage, an anchored portion formed about the gasket cable passage at a body-engagement end of the gasket, and a cantilevered portion formed about the gasket cable passage at a pusher-engagement end of the gasket.

18. The fiber optic connector of claim 17, wherein the collapsing cantilevered gasket is structurally configured to form:

an axially compressed sealing interface at the body engagement end of the gasket about the body cable passage, between the cable entry end of the connector body and the pusher; and an omnidirectionally compressed sealing interface at the pusher-engagement end of the gasket between the cantilevered portion of the gasket and an outer surface of a cable passing through the gasket cable passage of the gasket.

* * * * *